(12) United States Patent
Harvey et al.

(10) Patent No.: US 8,661,542 B2
(45) Date of Patent: *Feb. 25, 2014

(54) METHOD AND SYSTEM FOR DETECTING CHARACTERISTICS OF A WIRELESS NETWORK

(75) Inventors: Elaine Harvey, Oakton, VA (US);
Matthew Walnock, Sterling, VA (US)

(73) Assignee: Tekla Pehr LLC, Dover, DE (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/291,849

(22) Filed: Nov. 8, 2011

(65) Prior Publication Data

US 2012/0110635 A1    May 3, 2012

Related U.S. Application Data

(62) Division of application No. 12/421,841, filed on Apr. 10, 2009, now Pat. No. 8,078,722, which is a division of application No. 10/405,473, filed on Apr. 3, 2003, now Pat. No. 7,603,710.

(51) Int. Cl.
*G06F 21/00* (2006.01)

(52) U.S. Cl.
USPC ............................................ 726/23; 709/224

(58) Field of Classification Search
USPC ............................................ 726/23; 709/224
See application file for complete search history.

(56) References Cited

U.S. PATENT DOCUMENTS

| | | |
|---|---|---|
| 4,792,946 A | 12/1988 | Mayo |
| 4,951,029 A | 8/1990 | Severson |
| 5,325,419 A | 6/1994 | Connolly et al. |
| 5,539,824 A | 7/1996 | Bjorklund et al. |
| 5,603,054 A | 2/1997 | Theimer et al. ................... 710/6 |
| 5,737,318 A | 4/1998 | Melnik |
| 5,784,298 A | 7/1998 | Hershey et al. |
| 5,787,154 A | 7/1998 | Hazra et al. |
| 5,796,832 A | 8/1998 | Kawan |
| 5,812,865 A | 9/1998 | Theimer et al. ............... 709/228 |
| 5,815,553 A | 9/1998 | Baugh et al. |
| 5,854,985 A | 12/1998 | Sainton et al. |
| 5,892,442 A | 4/1999 | Ozery |
| 5,912,882 A | 6/1999 | Yafuso et al. |
| 5,915,226 A | 6/1999 | Martineau |
| 5,959,287 A | 9/1999 | Myers |

(Continued)

OTHER PUBLICATIONS

Kim et al., "Design of Network Security Control System for Cooperative Intrusion Detection", Feb. 2002, Springer-Verlag Berlin Heidelberg, p. 389-398.

(Continued)

*Primary Examiner* — Lisa Lewis

(74) *Attorney, Agent, or Firm* — Fitch, Even, Tabin & Flannery LLP

(57) ABSTRACT

Characteristics about one or more wireless access devices in a wireless network, whether known or unknown entities, can be determined using a system and method according to the present invention. An observation is made of the activity over a Wireless Area Network (WLAN). Based on this activity, changes in state of wireless access devices within the WLAN can be observed and monitored. These changes in state could be indicative of normal operation of the WLAN, or they may indicate the presence of an unauthorized user. In the latter case, an alert can be sent so that appropriate action may be taken. Additionally, ad hoc networks can be detected that may be connected to a wireless access point.

16 Claims, 10 Drawing Sheets

(56) References Cited

U.S. PATENT DOCUMENTS

| | | | |
|---|---|---|---|
| 6,009,247 A | 12/1999 | Canora et al. | |
| 6,014,558 A | 1/2000 | Thomas | |
| 6,028,551 A | 2/2000 | Schoen et al. | |
| 6,028,933 A | 2/2000 | Heer et al. | |
| 6,049,710 A | 4/2000 | Nilsson | |
| 6,081,601 A | 6/2000 | Raivisto | |
| 6,088,450 A | 7/2000 | Davis et al. | |
| 6,088,804 A | 7/2000 | Hill et al. | |
| 6,102,284 A | 8/2000 | Myers et al. | |
| 6,104,785 A | 8/2000 | Chen | |
| 6,134,453 A | 10/2000 | Sainton et al. | |
| 6,141,544 A | 10/2000 | Corriveau et al. | |
| 6,149,353 A | 11/2000 | Nilsson | |
| 6,195,547 B1 | 2/2001 | Corriveau et al. | |
| 6,230,002 B1 | 5/2001 | Floden et al. | |
| 6,252,883 B1 | 6/2001 | Schweickart et al. | |
| 6,281,790 B1 | 8/2001 | Kimmel et al. | |
| 6,285,318 B1 | 9/2001 | Schoen et al. | |
| 6,298,250 B1 | 10/2001 | Nilsson | |
| 6,300,902 B1 | 10/2001 | Eslambolchi | |
| 6,308,053 B1 | 10/2001 | Nilsson | |
| 6,310,549 B1 | 10/2001 | Loftin et al. | |
| 6,317,831 B1 | 11/2001 | King | |
| 6,327,550 B1 | 12/2001 | Vinberg et al. | 702/186 |
| 6,327,570 B1 | 12/2001 | Stevens | |
| 6,362,736 B1 | 3/2002 | Gehlot | |
| 6,405,318 B1 | 6/2002 | Rowland | 726/22 |
| 6,487,666 B1 | 11/2002 | Shanklin et al. | 713/201 |
| 6,704,874 B1* | 3/2004 | Porras et al. | 726/22 |
| 7,603,710 B2 | 10/2009 | Harvey et al. | |
| 7,702,806 B2 | 4/2010 | Gil et al. | |
| 7,778,606 B2 | 8/2010 | Ammon et al. | |
| 8,078,722 B2 | 12/2011 | Harvey et al. | |
| 8,122,506 B2 | 2/2012 | Harvey et al. | |
| 2001/0023446 A1 | 9/2001 | Balogh | |
| 2001/0039579 A1* | 11/2001 | Trcka et al. | 709/224 |
| 2003/0084323 A1* | 5/2003 | Gales | 713/200 |
| 2003/0135762 A1 | 7/2003 | Macaulay | 713/201 |
| 2003/0149888 A1* | 8/2003 | Yadav | 713/200 |
| 2003/0151513 A1 | 8/2003 | Herrmann et al. | |
| 2003/0188190 A1 | 10/2003 | Aaron et al. | |
| 2003/0217283 A1 | 11/2003 | Hrastar et al. | 713/200 |
| 2003/0226034 A1* | 12/2003 | Howard et al. | 713/201 |
| 2003/0233567 A1* | 12/2003 | Lynn et al. | 713/200 |
| 2003/0237000 A1 | 12/2003 | Denton et al. | 713/201 |
| 2004/0008652 A1 | 1/2004 | Tanzella et al. | 370/338 |
| 2004/0098617 A1 | 5/2004 | Sekar | 713/201 |
| 2004/0198392 A1 | 10/2004 | Harvey | |
| 2004/0252837 A1 | 12/2004 | Harvey et al. | 380/270 |

OTHER PUBLICATIONS http://www.mpirical.com/companion/mpirical_companion.html, last visit: Nov. 19, 2004.

Zheng et al., "A Network State Based Intrusion Detection Model", 2001, IEEE, p. 481-486.

IEEE 100: The Authoritative Dictionary of IEEE Standards Terms, 7$^{th}$ Edition, 2000, p. 1149.

Borisov, Nikita, et al., "Intercepting Mobile Communications: The Insecurity of 802.11", www.isaac.cs.berkeley.edu/isaac/wep-faq.html, (2001), pp. 1-9.

Arbaugh, W., et al., "Your 802.11 Wireless Network has no Clothes", Dept. of Computer Science, University of Maryland, Mar. 30, 2001, pp. 1-7.

"The Hornet", (2002), available at http://www.bvsystems.com/Products/WLAN/Hornet/hornet.htm,(last visited Apr. 30, 2002). pp. 1-5.

"A Practical Approach to Identifying and Tracking Unauthorized 802.11 Cards and Access Points," Interlink Networks, pp. 1-26, Apr. 1, 2001.

"Wireless LAN Security", An ISS Technical White Paper, 802.11b and Corporate Networks, Internet Security Systems (2001) pp. 1-9.

Kachirski et al., "Intrusion Detection Using Mobile Agents in Wireless Ad Hoc Networks," Proceedings of the IEEE Workshop on Knowledge Media Networking (KMIN '02) pp. 153-158.

Zhang et al., "Intrusion Detection in Wireless Ad-Hoc Networks," Proceedings of the 6$^{th}$ International Conference on Mobile Computing and Networking (MobiCom 2000), Boston, Massachusetts, Aug. 2000, pp. 275-283.

* cited by examiner

STATE TRANSITION TABLE - NODE X

| EVENT # | GENERATING DEVICE | FRAME SEEN | STATE # | INFRASTRUCTURE / ADHOC TYPE INDICATORS | |
|---|---|---|---|---|---|
| 1 | CLIENT A | PROBE REQUEST | 1 | BSSID | ⎫ 802 |
| 2 | AP001 | PROBE RESPONSE | | BSSID | |
| 3 | CLIENT A | AUTHENTICATION REQUEST | 2 | BSSID | CLIENT A |
| 4 | AP001 | AUTHENTICATION RESPONSE | | BSSID | INITIALIZING WITH |
| 5 | CLIENT A | ASSOCIATION REQUEST | 3 | BSSID | AND SENDING DATA |
| 6 | AP001 | ASSOCIATION RESPONSE | | BSSID | TO/FROM AP001 |
| 7 | CLIENT A | DATA (toDS = 1) | 5 | toDS SET | |
| 8 | AP001 | DATA (fromDS = 1) | | fromDS SET | ⎭ |
| 9 | CLIENT B | PROBE REQUEST | 1 | BSSID | ⎫ |
| 10 | AP002 | PROBE RESPONSE | | BSSID | 804 |
| 11 | CLIENT B | AUTHENTICATION REQUEST | 2 | BSSID | CLIENT B |
| 12 | AP002 | AUTHENTICATION RESPONSE | | BSSID | INITIALIZING WITH |
| 13 | CLIENT B | ASSOCIATION REQUEST | 3 | BSSID | AP002 |
| 14 | AP002 | ASSOCIATION RESPONSE | | BSSID | |
| 15 | CLIENT B | DATA (toDS = 1) | 5 | toDS SET | |
| 16 | AP002 | DATA (fromDS = 1) | | fromDS SET | ⎭ |
| 17 | CLIENT A | PROBE REQUEST | 1 | BSSID | ⎫ |
| 18 | AP001 | PROBE RESPONSE | | BSSID | |
| 19 | CLIENT A | AUTHENTICATION REQUEST | 2 | BSSID | 806 |
| 20 | AP001 | AUTHENTICATION RESPONSE | | BSSID | CLIENT A |
| 21 | CLIENT A | ASSOCIATION REQUEST | 3 | BSSID | INITIALIZING WITH |
| 22 | AP001 | ASSOCIATION RESPONSE | | BSSID | AND SENDING DATA |
| 23 | CLIENT A | DATA (toDS = 1) | 5 | toDS SET | TO/FROM AP003  808 |
| 24 | AP003 | DATA (fromDS = 1) | | fromDS SET | |
| 25 | CLIENT A | DATA (toDS = 1) | 5 | toDS SET | POSSIBLE |
| 26 | AP003 | DATA (fromDS = 1) | | fromDS SET | SPOOF  810 |
| 27 | CLIENT B | PROBE REQUEST | 1 | BSSID | |
| 28 | AP099 | PROBE RESPONSE | | BSSID | CLIENT B PROBING |
| 29 | CLIENT B | DATA (toDS = 1) | 1 | BSSID | ILLEGAL STATE |
| 30 | AP099 | DATA (fromDS = 1) | | BSSID | CHANGE |
| | | | | | ⎭ 812 |

FIG. 8

METHOD AND SYSTEM FOR DETECTING CHARACTERISTICS OF A WIRELESS NETWORK

RELATED APPLICATIONS

This application is a divisional of U.S. application Ser. No. 12/421,841, filed Apr. 10, 2009 now U.S. Pat. No. 8,078,722, which is a divisional of U.S. application Ser. No. 10/405,473, filed Apr. 3, 2003, now U.S. Pat. No. 7,603,710, the disclosures of which are incorporated herein by reference.

BACKGROUND

1. Field

The present invention relates generally to network security techniques, and more specifically to detecting characteristics of devices communicating in data networks employing wireless local area network (WLAN) technology.

2. Background

The Institute for Electrical and Electronic Engineers approved the "Standard For Information Technology; Telecommunications and information exchange between systems-Local and Metropolitan networks-Specific requirements; Part 11: Wireless LAN Medium Access Control (MAC) and Physical Layer (PHY) specifications: Higher speed Physical Layer (PHY) extension in the 2.4 GHz band" (known as 802.11b) for the development of products to allow computers and other devices to connect to wired Local Area Network (LAN) segments not with wires, but by using radio-based network interface cards (NICs) working in the public 2.4 GHz range. Such wireless access to a wired LAN is often referred to as a wireless network.

As a result of the 802.11 standard, many network products were developed that provide access points that are wired into a LAN segment and provide access to the network for the wireless client computers using these radio-based NICs. Because wireless connectivity can span outside the physical control of a building, the current physical security measures that attempt to prevent unauthorized access to a LAN are no longer effective. By using a Service Set Identifier (SSID), only those attempts to access the wireless network that use the same SSID on the client cards as is on the access point will connect. The SSID does not provide security, however, only identification. The SSID is sent in an unprotected fashion by both the access point and the clients, and can be easily captured and exploited.

Security measures were incorporated into the 802.11b protocol, including Wired Equivalent Privacy (WEP) data encryption and shared secret passwords. The shared secret passwords provide limited protection and are rarely used. WEP relies on a shared password used by the access point and the clients to encrypt the payload data of the transmission, but does not encrypt the header and other information about the communication. Further, WEP was developed before the export restrictions were lifted on encrypted algorithms. Because of this, WEP was only designed to use 40 bit keys and was not cryptographically complex. After the export restrictions were lifted, a 104-bit version was implemented. Unfortunately, this "stronger" version still used a flawed crypto implementation. It was not long before white papers were written describing how the WEP key could be broken. Soon after that, products appeared that could assist in breaking WEP.

The use of 802.11x wireless networks (where 802.11x refers to any of the 802.11 standards that define wireless protocols, including, for example, 802.11b and the recently released 802.11a) has grown significantly. This, coupled with the availability of low cost equipment in the consumer market, has raised many questions for IT department administrators about whether or not to implement a wireless network, and, if so, how to implement one. Many computer security policies likely preclude the utilization of any wireless network tied into the main network wiring. Others allow limited use for the convenience of their employees, but dictate strict security settings.

Contrasting this, certain industries necessitate the deployment of wireless networks. For instance, the sheer size and topology of an overnight package delivery company such as Federal Express requires the use of handheld wireless nodes in their day-to-day operations. Typically, most early wireless networks employed by companies such as this were proprietary. But due to the increase in available hardware and software, and due to the increased performance and ease to which 802.11x networks can be integrated into existing IT infrastructures, many companies such as Federal Express are switching to the commercially available systems.

In most situations, wireless breaches of wired networks go unnoticed. Unlike the plethora of security devices/services available for the wired network infrastructure few tools exist for the system administrator to detect wireless intrusions.

One security issue with wireless networks is the fact that it is inexpensive and easy to install a new wireless access point onto an existing wired network. This could open an otherwise secure network to outsiders. Many current wireless intrusion detection products work by monitoring the wired network for access points. This requires their use on every separate segment of the network, since each separate network segment would need to be monitored individually. Also, current solutions do not identify any client machines that are attempting to access the wireless LAN.

A second security issue involves locating wireless access devices (particularly unapproved ones) within a wireless network. A wireless access device can include any wireless device that can provide access to a network, including a wireless access point or wireless client. Traditionally, locating the source of radio signals, such as those emitted by a wireless access device, utilizes a TDF (Time/Distance Fix) approach that requires listening stations at known points in space, and the application of a timestamp and direction for a given radio transmission. This requires that all listening stations have directional antennas and highly accurate clocks that are synchronized to the other listening stations. These components of the solution are prohibitive in an office environment. Furthermore, the directional antennas are more expensive than their omni-directional counterparts. The use of directional antennas also implies that complete coverage of a given area can only be achieved with a greater number of listening stations than if omni-directional antennas where used. Lastly, the requirements for the accuracy and synchronization of the clocks increases as the range to the target decreases. Since an 802.11 wireless access device has a range of only several hundred feet, highly accurate and well-synchronized clocks are required, further increasing the expense of any potential solutions.

A third security issue involves early and accurate detection of possibly highly sophisticated network intrusions, such as spoofing. Traditional intrusion detection system (IDS) solutions attempt to capture and store network packets as quickly as possible for the purpose of attack detection, anomaly detection, and event correlation. This typically requires high bandwidth connections to the observed network, fast instruction processing, and large storage capacity.

When applied to wireless networks, the same problems exist. A traditional approach to intrusion detection involving 802.11 would require packets to be captured as quickly as a radio receiver could receive them. In addition, 802.11 networks operate on multiple channels, each of which must be observed separately. Thus, in order to observe all current 802.11b channels (of which there are 14), 14 different observing radios would be required. In addition to being cost prohibitive, power consumption and processing capabilities become greater issues.

There is therefore a need in the art for a wireless intrusion detection system and method that overcomes the above problems by providing a non-intrusive, robust, and transparent wireless intrusion detection capability that allows a wireless access device to be located within a wireless network and quickly and accurately identifies intrusions into the wireless network.

SUMMARY

In accordance with the present invention, a wireless intrusion detection system (WIDS) and method performs monitoring of wireless networks (including at least one wireless network being protected, known as the wireless network of interest), stores the results of that monitoring, processes the results to determine whether any unauthorized access of the wireless network of interest has occurred, detects characteristics of the wireless network and notifies users of the results and the processing. Furthermore, the WID system includes one or more WIDS nodes (which may include at least one primary WIDS node) for monitoring a particular geographic area, and a WIDS collector for collecting from the WIDS nodes the information monitored by all of the WIDS nodes. In an embodiment, the WID system can detect characteristics of the wireless network or of wireless access devices. Such characteristics can include the state in which a particular wireless access device is operating and the type of wireless network (which can include, for example, either an infrastructure network or an ad hoc network). Information about a network collected by a WIDS can include tracking of authorized and unauthorized access points and clients, locating any unauthorized wireless access devices, determining the status of any authorized access points, determining whether any authorized access points have changed, determining whether any authorized access points are not operating, identifying any denial of service (DoS) attempts, tracking of multiple connection attempts to the wireless network by any unauthorized wireless access devices, tracking how long any unauthorized wireless access device has attempted to access the wireless network, and identifying attempts to spoof an authorized access point. In an embodiment, the location of a wireless access device is determined by measuring a distance between a node and the wireless access device, measuring a second distance between another node and the wireless access device, determining an area based on the distance measurements, and determining an approximate location based on the intersection of those areas.

BRIEF DESCRIPTION OF THE DRAWINGS

FIG. 8 is a state transition table at a WIDS node.

DETAILED DESCRIPTION

Figure 1:
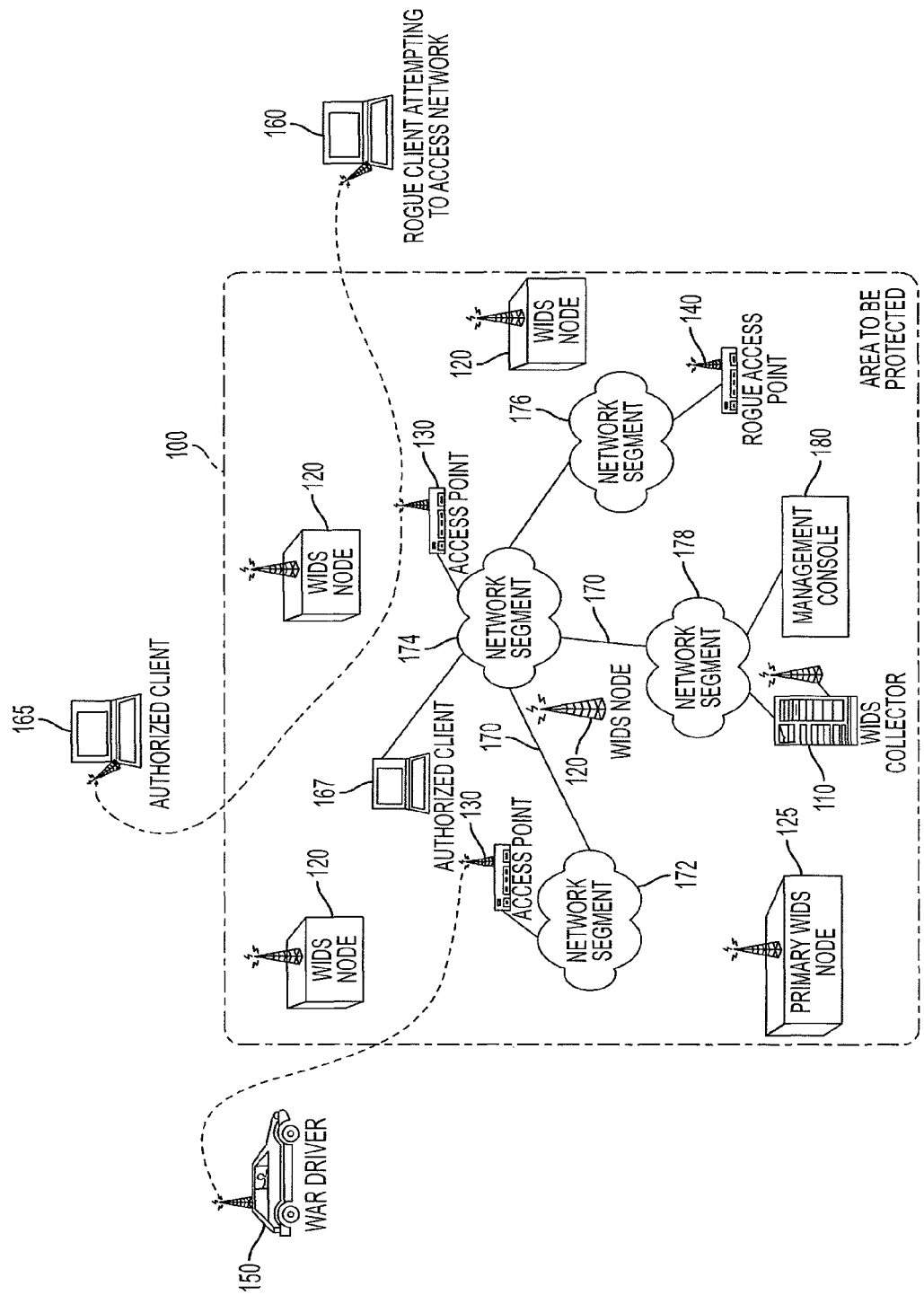
FIG. 1 is a diagram of a wireless network containing a WID system according to the present invention.

FIG. 1 depicts a wireless network containing an intrusion detection system (IDS) particularly focused on wireless events, according to the present invention. Such a wireless intrusion detection system (WID system or WIDS) monitors a specific geographic area to discover both authorized and unauthorized access points and authorized and unauthorized client machines that may be trying to connect to the wireless network. These access points and client machines are, collectively, wireless access devices. In one embodiment, the WID system has two functional parts: one or more WIDS nodes (or simply "nodes") that collect data from access points and clients; and one or more WIDS collectors (or simply "collectors") that collect the raw data from the WIDS nodes using an out-of-band means. The raw data (e.g., intrusion and status information) from the WIDS nodes can be stored in a database for access by a local web based management console, or sent to any Simple Network Management Protocol (SNMP) client software by the WIDS collector. Other features of a WID system are discussed in a related pending, commonly owned application filed May 17, 2002, entitled "Method and System for Wireless Intrusion Detection," U.S. application Ser. No. 10/147,308, the disclosure of which is hereby incorporated by reference.

In general, the number of WIDS nodes required for a WID system is based on the size of the area to be protected. The WIDS nodes, however, utilize passive detection so they are not easy to detect by an attacker. In addition, the out-of-band communications between the WIDS nodes and WIDS collector are encrypted, providing even further security.

The WID system in FIG. 1 is made up of WIDS collector 110 and a number of WIDS nodes 120. As a result of the initialization process that will be described in more detail below, at least one WIDS node 120 is designated as a primary WIDS node 125. Each WIDS node 120 that is not a primary WIDS node is also known as a secondary WIDS node. Primary WIDS node 125 communicates with other WIDS nodes 120 and WIDS collector 110 using a proprietary dynamic wireless protocol. Each WIDS node 120 along with primary WIDS node 125 provides wireless intrusion detection over a particular geographic area within the overall area 100 to be protected.

Authorized access to the wireless network can occur through various access points 130 that allow wireless access devices to access local area network (LAN) 170, to which access points 130 are attached. An authorized wireless client 165 can access the LAN via the wireless network through an access point 130 and have the same (or similar) usage of the wired network as an authorized client 167 connected to the LAN via a wired connection.

In addition to access points 130 within LAN 170 that have been authorized, an additional rogue access point 140 is shown in FIG. 1 that could be used for unauthorized access to the network. Additionally, unauthorized access to the LAN through the wireless portion of the network can occur via war driver 150 or rogue client 160 attempting to access via an allowed access point 130.

Rogue access point 140 could be an access point enabled by an authorized employee or could be an access point that an attacker has somehow installed on LAN 170. War driver 150 includes any well known approach for accessing wireless networks using "drive-by" techniques in which a person utilizes a wireless-enabled portable device to access unprotected wireless networks.

LAN 170 in FIG. 1 is a typical local area network, consisting of interconnected network segments 172, 174, 176, and 178. As will become apparent, the WID system can provide various types of information about attempts to access a wireless network. Such information is communicated to a user via management console 180 that can, for example, be running in the user's facility. Management console 180 can provide information on:

tracking of authorized and unauthorized access points and clients;
location of authorized and unauthorized wireless access devices;
changes to configurations of known and authorized access points;
health of WIDS nodes;
denial of service (DoS) attempts;
tracking of multiple connection attempts by unauthorized wireless access devices over a period of time;
tracking how long an unauthorized wireless access device has attempted to access the network; and
attempts to spoof an authorized access point.

In an embodiment, management console 180 can be implemented over a Secure Sockets Layer (SSL) encrypted web interface, as would be apparent. In addition, the management console is, in an embodiment, SNMP compatible and so can be used with features found in typical remote SNMP management software (including, for example, the OpenView software suite from Hewlett Packard) to notify the user via electronic mail (e-mail) or any other notification mechanisms. Additionally, the management console can provide multiple user authorization levels, allowing different people within an organization to have differing levels of access to the information in the WID system.

WIDS nodes 120 are loaded with software capable of inferring wireless network electromagnetic characteristics unique to the particular network configuration as deployed. In one embodiment, the location of each WIDS node is, at time of deployment, calibrated using known information from the wireless network of interest. Calibration input types can include, for example, measured distance to a known stationary calibration point, signal and noise levels, and other variables as appropriate. Location of an intrusion of the wireless network can be determined more accurately by applying a neural network or genetic algorithm to historical signal strength statistics collected from continuous input, as would be apparent. In addition, location of a wireless access device can be achieved by triangulating data on the wireless access device using information from multiple WIDS nodes.

WIDS collector 110 contains software that determines the proximity and approximate location of an event source to the WIDS node by implementing known algorithms to spatial coordinates and wireless signal characteristics. In one embodiment, geographic coordinates collected at linear intersections of a structure or coverage area are applied to a rectangular grid overlaid on a representation of the blueprint or spatial area. Using basic cartographic methods, geographic coordinates corresponding to WIDS nodes deployed on a campus, structure or other coverage area may be obtained. In one embodiment, triangulation methods may be used to calculate approximate position given signal information and coordinates.

Figure 2:
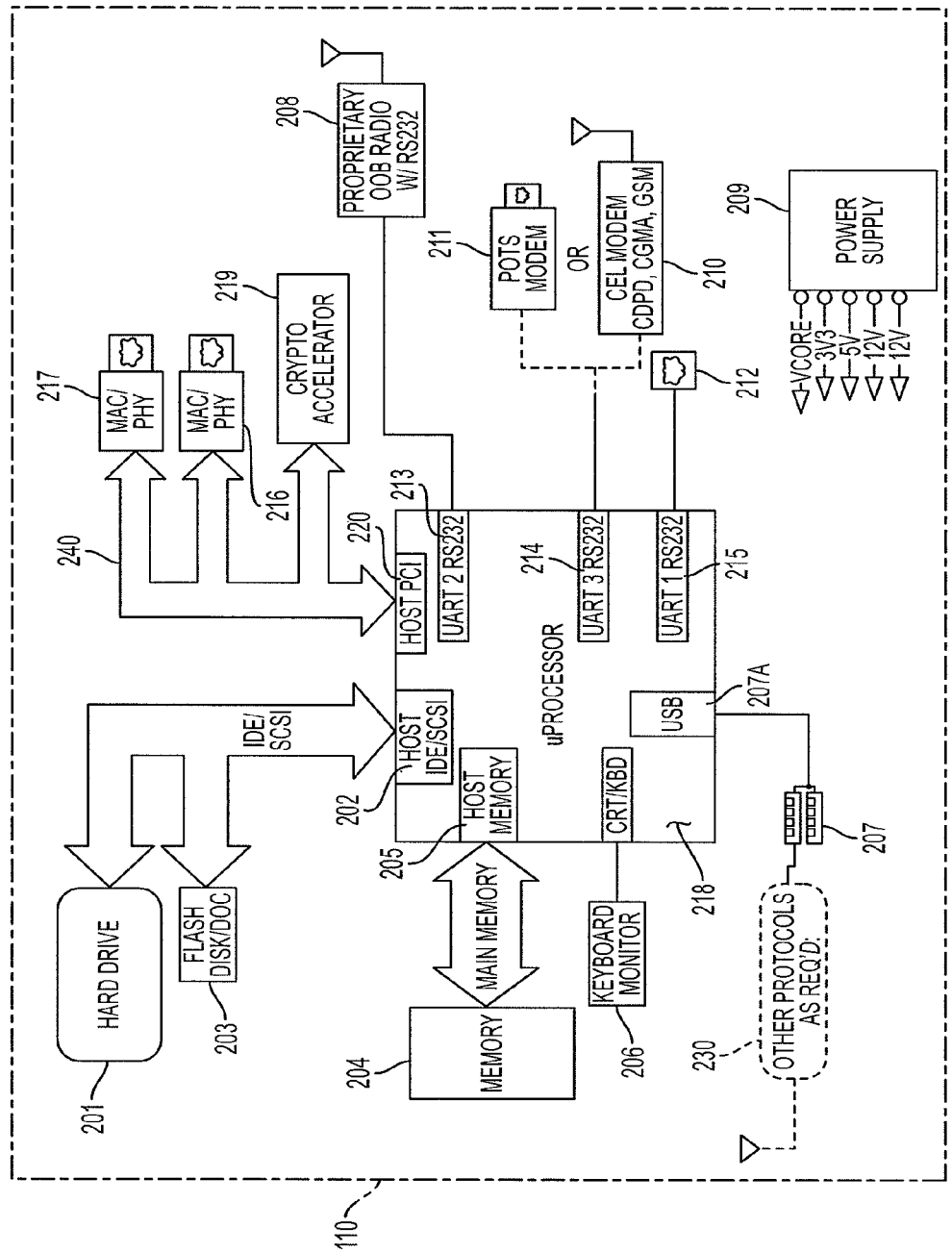
FIG. 2 is a hardware block diagram of a WIDS collector.

In FIG. 2, a WIDS collector 110 according to one embodiment of the present invention includes a host processor 218, flash based storage media 203, and a typical mechanical hard drive 201. Hard drive 201 could, for example, be a SCSI or IDE hard drive accessible over host port 202. Host processor 218 is also supported by memory 204 connected to a controller for the host 205, and a man-machine interface (MMI) (shown in this example as keyboard and monitor 206). Additional human interface is provided by RS232 compliant universal asynchronous receiver transmitter (UART) 215 connected to serial terminal connector 212. Power supply 209 provides power for the main subsystem and support components.

Figure 3:
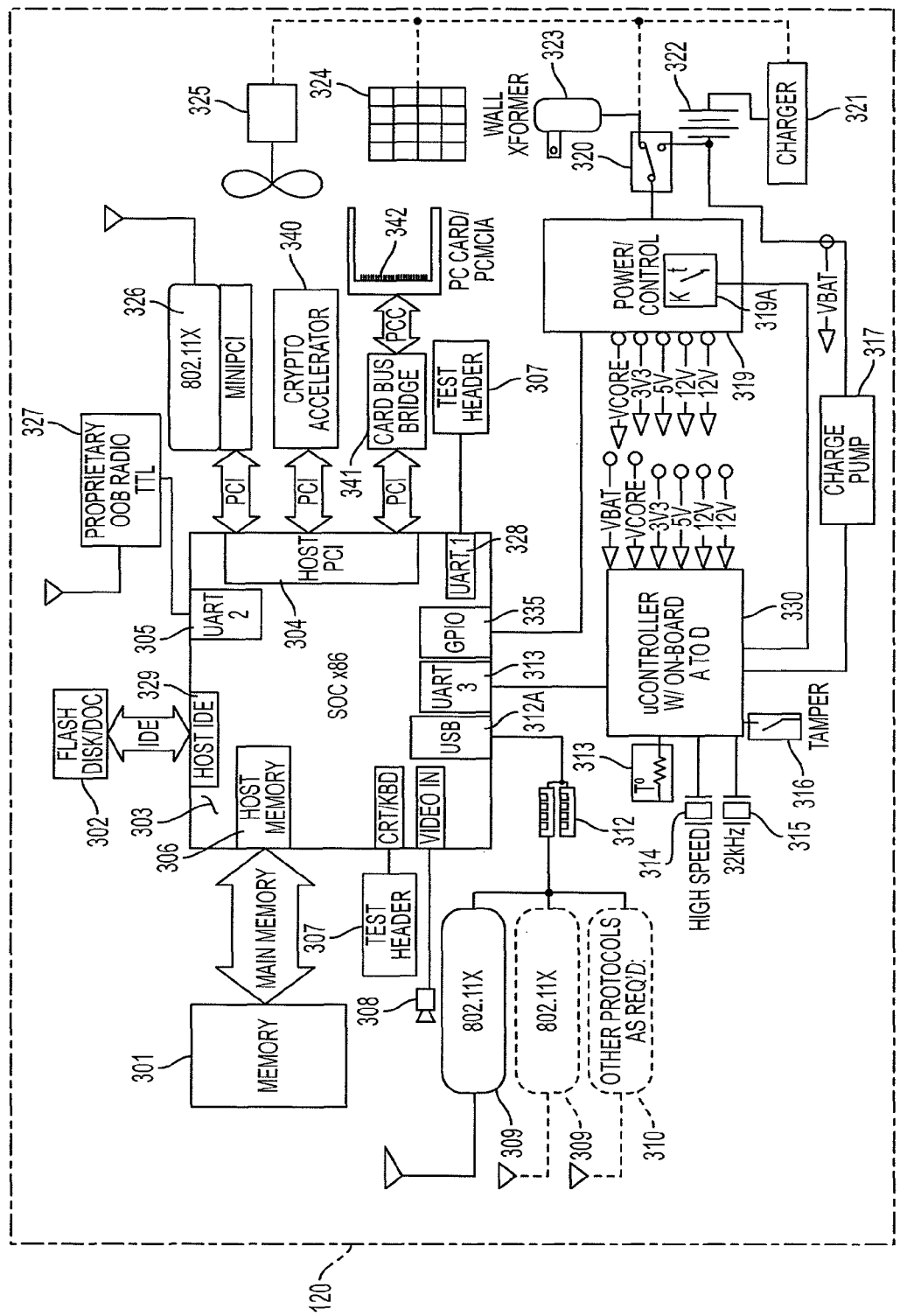
FIG. 3 is a hardware block diagram of a WIDS node.

The communications link between WIDS collector 110 and WIDS nodes 120 uses a proprietary out-of-band radio 208 connected to a standard RS232 UART port 213 of host processor 218. In this particular implementation, out-of-band radio 208 contains the necessary level shift required for 10-12V signaling and is protocol and RF interoperable with out-of-band transistor-transistor logic (TTL) radio 327 of WIDS node 120 (as shown in FIG. 3).

In addition, communication means 230 is provided to allow WIDS collector 110 to communicate with WIDS nodes 120 using other radio protocols. These protocols could, for example, include new technologies such as ultra wideband (UWB), or other narrow band and spread spectrum devices. Connection of other radio devices using other radio protocols over communication means 230 in this embodiment is via standard universal serial bus (USB) ports 207A and USB host connector 207, though other I/O such as the host expansion bus 240 could be used.

Connection of WIDS collector 110 to a wide area network (WAN) or monitoring facility is accomplished via an expansion bus shown here as host expansion bus 240 using either the Media Access Controller (MAC) or Physical Interface (PHY) of the main NIC interface 217 or the ancillary NIC subsystem 216, as would be apparent. Additional connectivity to the WAN is provided by a modem 211 or a cellular connection 210 via another UART 214. Other WAN connections could also be used as they become available and interfaced using any other expansion interfaces.

For protection of the data transmission between WIDS collector 110 and WIDS nodes 120 a cryptographic accelerator 219, such as those offered by Broadcom and HiFn, is provided, shown here using host expansion bus 240 to communicate with host processor 218 over host PCI port 220.

As shown in FIG. 3, WIDS node 120 consists of a low power embedded processor 303. Many processor architectures are available as embedded devices with ARM and x86-based devices being readily available. In an embodiment, an x86-based system-on-chip (SOC) device such as National Semiconductor Geode SC2220 was selected as embedded processor 303. Since this is an embedded device, a flash disk 302 is connected to host IDE port 329, which can, as would be apparent, allow for firmware updates of WIDS node 120. Other flash-based storages such as disk on chip (DOC) or compact flash could also be used. Memory 301 interfaces to embedded processor 303 via host memory interface 306, as would be apparent. Test headers 307 are provided on the CRT and keyboard ports as well as the console UART 328. In this instance, a camera input is provided by embedded processor 303 for optional camera 308 connections. This can be used to provide such things as visual verification and video capture for later prosecutions of suspected intruders, along with any other purposes that would be served by having video information.

Power for WIDS node 120 is provided by the power/control subsystem 319 that can be "shore powered" with alternating current (AC) using a typical wall transformer 323. Battery operation or backup can be maintained via a rechargeable cell 322 and charging system 321. Full time battery operation can be selected using jumper 320. Charge voltage and current can be from wall transformer 323, or via solar panels 324 and/or small windmill 325 to eliminate wiring requirements in outdoor locations.

During battery operation, power management can be achieved using a small microcontroller 330, such as the Microchip 16C74. This particular device provides a very low power standby mode using 32 kHz watch crystal 315 for sleep mode and high speed crystal 314 for normal, full power operation. Microcontroller 330 controls the main power supply 319 via relay control 319A. During sleep mode, microcontroller 330 receives power via low quiescent charge pump 317 directly from rechargeable cell 322. Control of power/control unit 319 is also available via the SOC General Purpose I/O (GPIO) port 335.

Microcontroller 330 also provides engineering data for remote WIDS node 120 using the eight on-board analog-to-digital (A/D) converters. For example, case temperature is provided to the microcontroller 330 A/D converters using a thermistor 313. Case tamper information is provided via the tamper mechanism 316, also connected to the microcontroller 330 A/D's since it is always on, even during sleep mode. This data, in addition to other diagnostic info such as supply voltages and battery charge, are monitored and sent to embedded processor 303, in this example, via the UART 313. This information is relayed to the WIDS collector 110 to monitor the health (or status) of the remote WIDS node 120.

WIDS node 120 connectivity to WID controller 110 is provided using the aforementioned proprietary out-of-band radio protocol. Proprietary TTL-level out-of-band radio 327 connects to embedded processor 303 via UART 305. Other protocol radios 310 can be used for both the out-of-band function or as additional monitoring interfaces.

Another method for connection of the typical wireless LAN network interface card (NIC) is provided by a multitude of possible interfaces. Multiple USB WLAN devices 309 are connected using USB port 312A on embedded processor 303 via connector 312. As higher speed WLAN devices become available, connection to the host embedded processor 303 expansion bus, in this case the host PCI 304, affords higher data rate WLAN devices 326 shown here using the MINIPCI form factor. Additionally, provision is made for connection of Card Bus/PCMCIA style of WLAN devices using Card Bus bridge 341 and Card Bus/PCMCIA connector 342.

WIDS node 120 encryption processing is shown as being provided by a dedicated cryptographic accelerator 340 connected to the host PCI bus 304 of embedded processor 303. This off loads the processing of encrypted data from the host embedded processor 303.

As described above with reference to the WID system in FIG. 1, the WID system consists of a central administrative and analysis component (i.e., WIDS collector 110) and multiple wireless data acquisition components (i.e., WIDS nodes 120). WIDS collector 110 to WIDS node 120 communications and WIDS node 120 to WIDS collector 110 communications occur across an out-of-band packet radio network. In one embodiment, a 900 MHz radio network is used for the out-of-band communications. To accommodate potential radio interference and increase scalability, any WIDS node 120 may act as the primary data communications proxy (i.e., primary WIDS node) for other WIDS nodes (the other WIDS nodes being called secondary WIDS nodes or nodes).

A WIDS trap service describes a simple TCP service present on all WIDS nodes 120 (including primary WIDS node 125) and WIDS collector 110. This service functions to forward data to the appropriate software subsystems. This service provides to the WID system a method of encrypted data transport between WIDS nodes 120 and primary WIDS nodes 125, and primary WIDS nodes 125 and WIDS collector 110. This service is responsible for the communication of all WIDS packet types, in one embodiment to include configuration, diagnostic, and health. The WIDS trap service also transfers unencrypted packet payloads to parser component for further processing or analysis, as appropriate.

A WIDS parser component describes a simple utility present on all WIDS nodes 120 (including primary WIDS node 125) and WIDS collector 110 which communicates received data to appropriate operating system or application components. In one embodiment, the WIDS node parser implementation receives unencrypted packets of type configuration from the WIDS trap service. Packets of type "configuration" contain specific instructions to update WIDS node system files, software, device firmware, and other critical components as appropriate. The WIDS collector parser implementation receives unencrypted packets of type "diagnostic" and "event" from the WIDS collector trap service. In one embodiment, a WIDS collector parser applies basic formatting to the data and forwards the resulting information to a MySQL database service or SNMP-capable enterprise management software.

In an embodiment, a WIDS Communication Protocol (WCP) defines a communications method between WIDS nodes 120 and WIDS collector 110. The primary network service associated with these communications is referred to as the "Trap Service", as described above. WCP is an application-layer transmission control protocol (TCP) that provides communications between WIDS node and WIDS collector Trap Service daemons via Generalized Radio Internet Protocol (GENRIP) packets that have been encrypted with Advanced Encryption Standard (AES). A pre-loaded "customer key" is used to encrypt configuration, initialization, and key exchange packets. A unique "session key" generated by WID collector 110 is used to encrypt event and health packets for each instance of WID node 120. In an embodiment, both the customer key and session key are 256-bit keys, but other key lengths can be used for either key.

The WCP defines at least four different types of packets, each of which is described in further detail below. In general, a generic packet type contains information that defines the packet as a WCP packet and provides common information for all packet types; a diagnostic packet type contains data regarding the status of the WIDS nodes; an event packet type contains information regarding events that have occurred in the wireless network; and a configuration packet type contains information regarding the system configuration, including software versions, applications, and operating system information.

TABLE 1

WCP generic packet

| IP | TCP | HEADER | TIMESTAMP | TYPE | PACKET |

In an embodiment, the fields in the generic packet type have the structure shown in Table 1. The generic packet is a component of all other WCP packets, and uniquely identifies them as being WCP packets. The generic packet is used between the WIDS collector and primary WIDS nodes, and between the primary and secondary WIDS nodes (i.e., throughout the WID system). The main function of the generic packet is to identify the packet as a WCP packet. The HEADER field has a length of 16 bits and contains the static value of 0x4E53, providing the WCP packet identification.

The TIMESTAMP field in the generic packet ensures that each packet has a timestamp associated with it. This can be used for a number of purposes, including, for example, to preserve the time of particular events that will allow resolution of issues related to latency caused by network congestion. In an embodiment, the value placed in the timestamp field is provided by a POSIX 0.1 time( ) system call. The type field in the generic packet, in one embodiment of the WCP, is an 8-bit value that indicates to the trap service how to process the packet or specifies to which subsystem that packet belongs.

value indicates the voltage level on the 3.3 VDC supply, the V2 value indicates the voltage level on the 5.0 VDC supply, and the V3 value indicates the voltage level on the 12.0 VDC supply. The BATT field provides an estimate of the percentage of battery life left.

The checksum field in the diagnostic packet can be used to provide host-based tamper detection and session hijacking detection. In an embodiment, the checksum can be a cryptographic hash value generated from unique system variables, thereby providing data integrity. For example, a hash could be computed from combining the IP address of the radio, the unique serial number of the Geode processor, and a media access control (MAC) address unique to the WIDS node, as would be apparent.

Finally, the RESERVED field in the diagnostic packet can be used for monitoring future events or functionality. For

TABLE 2

WCP diagnostic packet

| WCP | Tcpu | Tsys | V0 | V1 | V2 | V3 | BATT | CHECKSUM | RESERVED |

The diagnostic packet type (with a TYPE value of 0x01 in an embodiment) shown in Table 2 is sent from the secondary WIDS nodes to the primary WIDS nodes, and the primary WIDS nodes pass it on to the WIDS collector, both communications using 256-bit AES encryption and a session key that will be described in further detail below. The WCP field in the WCP diagnostic packet contains a WCP generic packet, as described above, to provide the basic information to the recipient of the packet.

The diagnostic packet communicates status data from the secondary WIDS nodes to the primary WIDS nodes, including, for example, temperature, battery life, and voltages. Once the WIDS collector receives this diagnostic data on all WIDS nodes from the primary WIDS nodes, the WIDS collector can determine the system status. Once the system status has been evaluated by the WIDS collector, it can cause various courses of action to be taken that are appropriate in light of the received data. For example, if the WIDS collector determines that the battery life of a particular WIDS node is very short, the WIDS collector can send out a message to a system operator notifying the person that the batteries need to be changed.

As shown in Table 2, there are a number of fields in the diagnostic packet in one embodiment. The Tcpu, Tsys, V0, V1, V2, V3, and BATT fields are each 8-bit fields that provide information related to the health of the particular WIDS node. The Tcpu value indicates the temperature of the CPU. The Tsys value indicates the ambient temperature of the WIDS node inside the case. The V0, V1, V2, and V3 values each indicate the level of a different voltage source. The V0 value indicates the voltage level on the 2.5 VDC supply, the V1 example, individual bit flags could be defined for indicating particular types of tampering.

TABLE 3

WCP event packet

| WCP | CLASS | SRC | DST | CHANNEL | SSID | WEP | RSS | RESERVED |

The WCP event packet (with a TYPE value of 0x02 in an embodiment) depicted in Table 3 communicates events that occur in the wireless network from secondary WIDS nodes 120 to primary WIDS node 125, and then back to WIDS collector 110, using 256-bit AES encryption and a session key that will be described in further detail below. The WCP field in the WCP diagnostic packet contains a WCP generic packet, as described above, to provide the basic information to the recipient of the packet.

The CLASS field in the event packet is a 6-bit field identifying the class and subclass of packet received by the WID node. In one embodiment, this field describes the packet as one of 802.11b packet classifications Management, Control and Data. Associated sub-classes of packet type Management in this embodiment may indicate 802.11b link-layer mechanisms such as Association, Authentication, Probe, Beacon and others, as are apparent.

The SRC field in the event packet is, in one embodiment, a 48-bit field that contains the MAC address of wireless access devices detected during data collection performed by WIDS nodes 120 in the WID system. In an 802.11 wireless network, for example, the value in the MAC field could correspond to the MAC addresses of detected clients or access points. Upon receipt of the event packet, WIDS collector 120 can determine the significance of the received MAC addresses.

The DST field in the WCP event packet is a 48-bit field containing the MAC address of wireless access devices for which the detected event is destined. In an embodiment deployed for 802.11 technologies, this value applies to the wireless interface of an access point, broadcast address (ff:ff:ff:ff:ff:ff) or wireless interface of a client supporting ad-hoc mode, as would be apparent.

The SSID field in the WCP event packet is a 256-bit service set identifier of access points. This field allows a determination of specific information about a particular wireless access device, such as the name of an access point. This can be used to help identify whether the wireless access device is a known wireless access device or an unknown wireless access device. Further information on the SSID can be found in Section 7.3.2.1 of IEEE std. 802.11b.

The CHANNEL field in the WCP event packet is an 8-bit value that indicates the channel on which the event was detected. For example, in the 802.11b protocol, channels 1 through 11 are used in the United States, channels 1 through 13 are used in Europe, and channel 14 is used in Japan. Thus, the CHANNEL field in a WID system for 802.11 would contain the channel number being used by the access point or client in the 802.11 wireless network. To maintain applicability of this field to new and emerging wireless network technologies, possible data values exceed those described by an 802.11b network embodiment.

The WEP field in the WCP event packet is a 4-bit value that indicates whether Wired Equivalent Privacy (WEP) has been enabled. WEP is a security protocol that utilizes encryption to protect 802.11 transmissions, as would be apparent. In one embodiment, the first bit indicates whether WEP is enabled on the detected wireless access device while the remaining bits are reserved. This field could also be used, in another embodiment, to indicate the version of the 802.11 protocol being implemented in the wireless network of interest (e.g., 802.11b, 802.11a, or 802.11g).

The RSS field in the WCP event packet is an 8-bit value that indicates the Received Signal Strength (RSS) of the particular event. In one embodiment the signal level is collected by the firmware of the 802.11 interface and passed to the application through a software driver interface. The RSS field would then indicate the signal strength in dBm.

The RESERVED field in the WCP event packet is a 64-bit field that is reserved for future development and expansion. Potential uses include, for example, the mode of operation of the remote 802.11 wireless access device, identifying patterns of hostile traffic or other vulnerabilities, and any other information related to the state of detected events.

TABLE 4

| WCP configuration packet |
| --- |
| WCP | CMD | DATA |

The WCP configuration packet (with a TYPE value of 0x03 in an embodiment) depicted in Table 4 updates system configuration information in primary WIDS node 125 and secondary WIDS nodes 120, using 256-bit AES encryption and a preloaded customer key. The preloaded customer key is a unique key for each customer that is loaded into WID collector 110 and WID nodes 120. It is used to encrypt all WCP configuration packets (except those that contain the "enter configuration mode" command). The configuration packets can contain updated system configuration information, drivers, firmware, kernels, and applications. The WCP field in the WCP diagnostic packet contains a WCP generic packet, as described above, to provide the basic information to the recipient of the packet.

The CMD field in the WCP configuration packet is a 4-bit value that contains commands to be executed by the receiving unit (i.e., the WIDS nodes). In an embodiment, the commands with the values 0x0 and 0xF are reserved values.

Numerous commands can be implemented in WCP for performing a number of different functions within the WID nodes. The current command set includes the following:

AES Key Exchange
Value for CMD field: 0x01
Data:
  256-bit session key for use in the AES algorithm to encrypt communications between the secondary WIDS nodes and primary WIDS node, and between the primary WIDS node and the WIDS collector.
  Time-to-live (TTL) value, which, in an embodiment, is a standard UNIX timestamp. The use of an exact timestamp rather than a traditional time to live value (i.e., a value the merely indicates when use of a particular key is to cease) accounts for possible drift between different clocks in WIDS collector 110 and WIDS nodes 120. For example, WID nodes may experience up to a $\frac{1}{20}$.sup.th second clock drift per 15 minute polling period.

System Configuration
Value for CMD field: 0x03
Data: Packet payload may include command scripts and binary data to update system configuration, drivers, firmware, and other system software.

If the session between primary WIDS node 125 to WIDS collector 110 is disrupted, the WIDS collector broadcasts a Network Reset and indicates error condition on Console. If WIDS collector 110 issues a System Update, primary WIDS node 125 issues Network Reset broadcast to all Nodes. WIDS collector 110 issues a packet of type configuration with command System Update to primary WIDS node 125 to initiate replacement or modification of system configuration data, binaries, device firmware, or other WIDS components as is apparent. In one embodiment, primary WIDS node 125 issues a Key Reset command in a packet of type configuration broadcast to all WIDS nodes. Those WIDS nodes which receive a Key Reset complete transfer of pending diagnostic or event data, and revert to a system state awaiting packets of type configuration encrypted with a unique pre-loaded customer key. Primary WIDS nodes receive system update information from WIDS collector 110 and transmit it to the WIDS nodes 120 for integrity verification and subsequent implementation of system updates.

The protocol above can be used by WID system to exchange information that can be used to locate a wireless access device within the wireless network. In particular, through the use of some simplifying assumptions and known properties of 802.11 wireless access devices, a WID system can be used to locate a wireless access device using omnidirectional antennas and without dependencies on system clocks.

A WID system using this approach requires the approximate positions of the listening stations to be known. Additionally, each WIDS node can be tuned using the location of a known target wireless access device. This tuning allows the system to take into account any variations in the immediate environment of the WIDS node.

Figure 4:
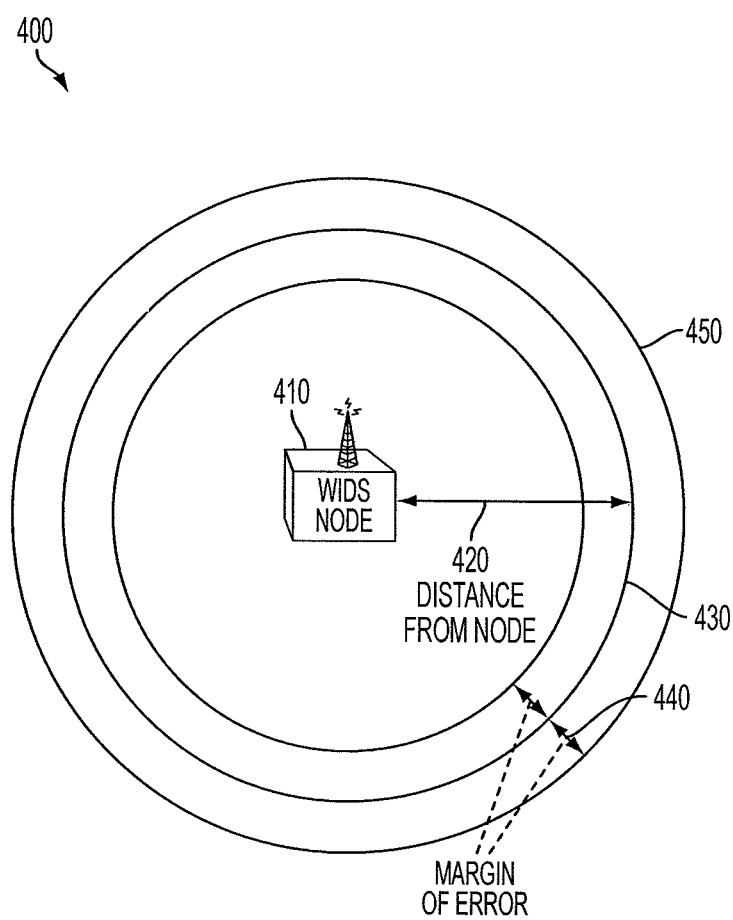
FIG. 4 is a diagram of an approximation band around a WIDS node.

FIG. 4 depicts a first approximation by a WIDS node 410 of the location of a wireless access device within a wireless network. In order to determine the location of wireless access devices, WIDS node 410 first determines the channel on which each target wireless access device is operating.

The determination of the channel on which a wireless access device is operating is affected by the concept of "channel bleed", which is the 802.11 defined method of transmitting a radio signal on a channel adjacent to the intended channel to allow wireless access devices to better find existing wireless networks. Channel bleed results in the ability to detect 802.11 communications, at a lower received signal strength (RSS), on channels other than the channel on which a wireless access device is transmitting at full strength. The inclusion of channel bleed signals in the determination of the location of a target wireless access device would erroneously lead to distance calculations that will make the wireless access device appear further away than it actually is. Consequently, it is necessary to determine the channel on which the target wireless access device is transmitting at full strength.

Channel determination can be affected by certain characteristics of the particular mode of wireless network operation. For example, in an 802.11 network operating in infrastructure mode, access points are responsible for keeping all members of the network transmitting and receiving transmissions on the same channel. According to the 802.11 protocol, the access point either remains on the same channel at all times or has a predictable channel hopping pattern that all members of the network follow. In an ad-hoc network, however, a list of member wireless access devices is not maintained by any single member of the network. Therefore, there is no single device which can provide the current channel of all of the other wireless access devices in the network. In an embodiment of the present invention, a determination can be made of the channel on which a wireless access device is communicating without the need to contact an access point or become a member of the ad-hoc network. The only data required is the RSS of transmissions from 802.11 wireless access devices across the various channels of the 802.11 spectrum.

To determine the channel on which a wireless access device is communicating according to the present invention, each WIDS node in the wireless network observes certain activity on each channel in the wireless network for a limited period of time. The data gathered can then be used to calculate the channel on which each of the observed wireless access devices is communicating. In one embodiment of the present invention, each WIDS node spends two seconds observing an 802.11 channel. The RSS of all transmissions received on that channel is stored. The WIDS node moves onto the next channel and observes that channel for two seconds. After observing and storing the activity on all 802.11 channels, a table containing the channel and signal strength can be formed using wireless access devices as the key. In one embodiment, the table is stored at the WIDS node. To form the table, the WIDS node utilizes the observed data for each wireless access device, which contains the observed channel and signal strength. From this set of data, an average RSS is calculated per wireless access device per observed channel. For each wireless access device, the channel on which the wireless access device is transmitting is determined from the channel with the largest average RSS.

In the case of 802.11 networks that maintain the same channel over the lifetime of the network, the table resulting from the above steps can be maintained over time to further validate the calculated channel. In an embodiment, the weight given to data gained from previous passes through the 802.11 spectrum is reduced with each subsequent pass. In the case of networks that utilize channel hopping, however, the data from previous passes through the 802.11 channels must be discarded before beginning a new pass. Further, the type of network in use can easily be obtained through trivial observation of the 802.11 packets transmitted by the wireless access devices.

As described above, an average RSS for transmissions on the wireless access device's channel is stored in order to generate more accurate location information for a target wireless access device. Since 802.11 wireless access devices tend to be attached to mobile systems, in one embodiment a weighted average RSS is maintained to account for the movement of the target wireless access device. As time passes, a single RSS data point carries less and less weight in the average utilizing this approach. This results in an average RSS that provides information that will allow both an accurate location of a target wireless access device at a given time as well as the ability to track a wireless access device that is moving.

Based on the received signal strength and the sensitivity of WIDS node 410, a distance 420 from WIDS node 410 can be determined. In particular, distance is a function of the RSS of the transmission. The following formula is used to determine distance 420 from WIDS node 410 to a target wireless access device:

$$RSS(dBm) = C - 35 \log_{10} D$$

where C is a tuning constant and D is the distance, as specified in "A Practical Approach to Identifying and Tracking Unauthorized 802.11 Cards and Access Points," by Interlink Networks, Inc.

Since WIDS node 410 does not have the capability to determine directional information from a wireless access device, distance 420 from WIDS node 410 can be viewed as corresponding to an area around WIDS node 410. In one embodiment, distance 420 can be a radius of a circle 430. Thus, from distance 420, circle 430 can be determined. Circle 430 represents all possible points where a target wireless access device with a particular RSS could be located. In one embodiment, predetermined margin of error 440 is added and subtracted from distance 420 to account for possible error in the determination of distance 420. This produces approximation band 450 which represents the overall approximate area within which a target wireless access device at distance 420 could be located.

In one embodiment, WIDS node 410 is known to have a constant (C) of 80.0. By way of example only, if WIDS node 410 determines a received signal strength of 24 dBm for a particular detected wireless access device, WIDS node 410 can determine that the distance to such a wireless access device is 132.7 feet. With margin of error 440 of 10 feet, approximation band 450 with a width of 20 feet will be centered on WIDS node 410.

In addition to determining the channel on which a wireless access device is communicating, the approach described above can also be used to detect ad hoc networks. In one embodiment, each WIDS node in the wireless network is already observing data in the wireless network, in order to calculate the signal strengths and, ultimately, the distances for each wireless access device detected. That same data can be parsed and examined by the node. In particular, the node can examine the Basic Service Set Identifier (BSSID) of the observed packets. In an infrastructure network, the BSSID of a particular device is set to the MAC address of that device. In contrast, the BSSID in an ad hoc network will consist of a number of random bits generated by the first member to join the ad hoc network. In one embodiment, the BSSID in an ad hoc network can be 46 bits. By examining the BSSID bits, the WIDS node can determine if the observed packets are a part of an infrastructure or ad hoc network.

Figure 5:
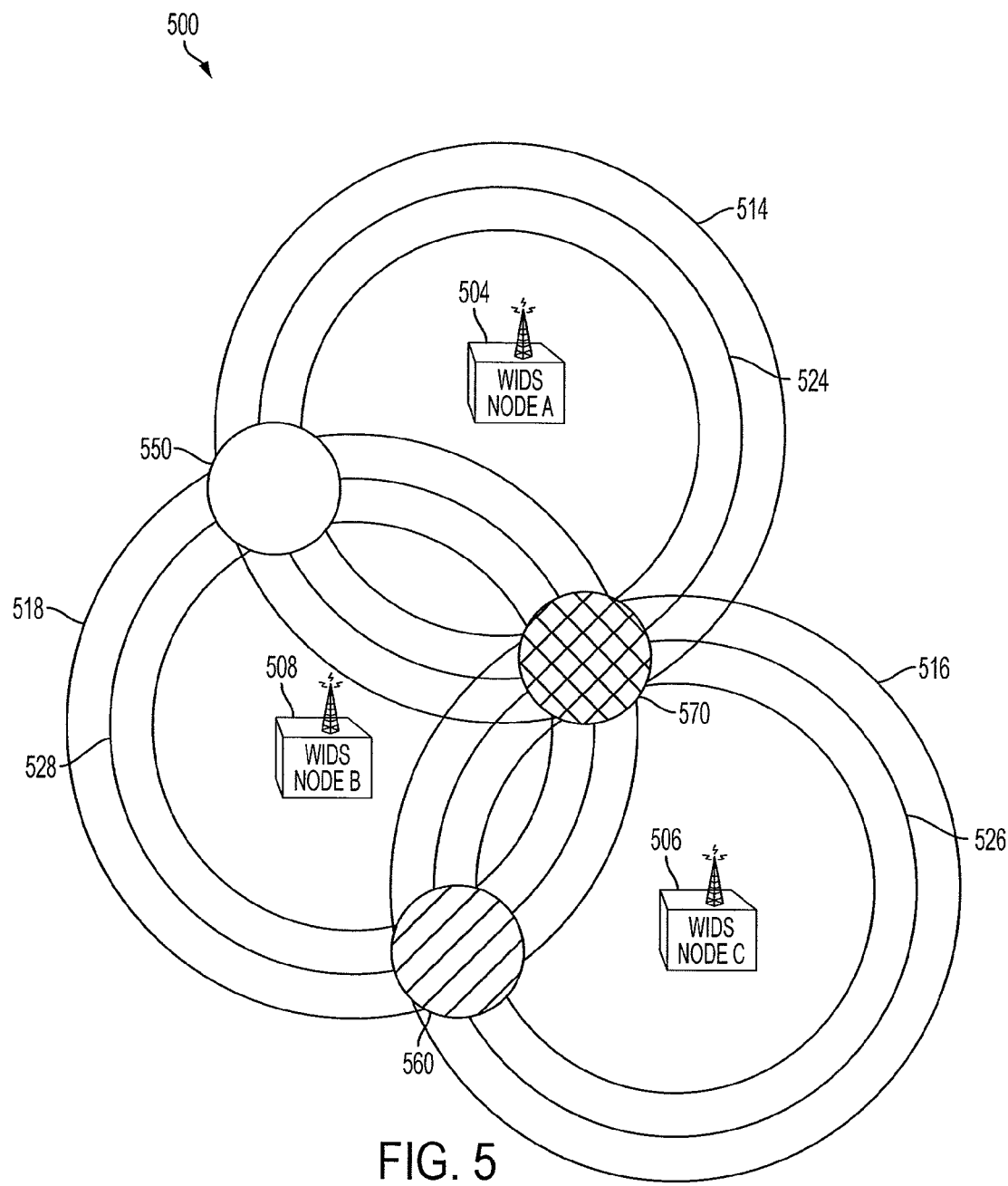
FIG. 5 is a diagram of approximation bands around multiple WIDS node.

Since a WIDS node can only determine received signal strength, but not determine direction, multiple WIDS nodes can be used to better approximate the actual position of a wireless access device. FIG. 5 shows WIDS node 504, WIDS node 506, and WIDS node 508 within a wireless network 500. In an exemplary embodiment, WIDS node 504 determines distance 524 for a particular wireless access device. Similarly, WIDS node 506 determines distance 526 for a particular wireless access device and WIDS node 508 determines distance 528 for a particular wireless access device. Accordingly, approximation bands 514, 516, and 518 can be calculated for WIDS nodes 504, 506, and 508 respectively. When a wireless access device falls within the range of two or more WIDS nodes, approximation bands 514, 516, and 518 can overlap as shown by the shaded areas in FIG. 5. Each intersection of approximation bands around two or more WIDS nodes, which, in one embodiment are calculated at the WIDS collector, represent a possible location of the wireless access device being detected. The more approximation bands that overlap at approximately a single point, the higher the probability that that point is the actual location of the wireless access device.

In particular, overlap area 550 shows the intersection of approximation band 514 around WIDS node 504 and approximation band 518 around WIDS node 508. Likewise, overlap area 560 shows the intersection of approximation band 516 around WIDS node 506 and approximation band 518 around WIDS node 508. Overlap area 570 represents the intersection of all three approximation bands. Since this area has approximation bands from three WIDS nodes overlapping, it represents the area where the highest probability exists that a wireless access device is located within that area.

The approach described above, in addition to using only omni-directional antennas, does not require highly precise system clocks for the system components (i.e., the system clocks can be synchronized to a much coarser resolution than prior approaches). The approach also requires fewer listening stations to cover a given area than would be needed for a typical IDS solution. Additionally, the location of a wireless access device can be determined regardless of the device manufacturer or antenna the wireless access device is using. Also, the use of omni-directional antennas allows any wireless access device within the range of the WIDS node to be tracked.

The approach to locating wireless access devices using a WID system as shown in FIG. 5 also provides the ability to track wireless access devices that are moving. While the direction and speed of a moving target wireless access device has a tendency to skew the results of a typical IDS solution, in the above approach the arrival time of a signal is not a factor in determining location. Thus, moving wireless access devices can be tracked with the same accuracy as a stationary target.

The above described technique can also be used to detect MAC spoofing, based on the location information for a particular wireless access device. Although the MAC address of a wireless access device represents an identifier that should be unique across all network devices, most 802.11 network wireless access device manufacturers actually allow users to change the MAC address of the wireless access device. This ability to change the MAC address of a wireless access device presents a challenge when an intrusion detection system relies on the uniqueness of the MAC address to track the wireless access device. In addition, numerous attacks on wireless networks begin with a modification to the MAC address of the attacking wireless access device. The ability to identify modified MAC addresses becomes critical to the effectiveness of any wireless IDS system.

To detect modified MAC addresses, the location of a transmitting 802.11 wireless access device can first be determined as described above. This location can then be associated with the observed wireless access device. When a new observation is made of that wireless access device, the new location can be compared with the old location. If the location has not changed or varies within a reasonable range (given the time difference between observations), it can be assumed that the MAC address of the wireless access device has not been replicated. Should the same MAC address be observed in two or more locations in a short period of time, however, it can be assumed that one or more wireless access devices are using the same MAC address. In particular, if the wireless access device is defined to have a static location, the observed location and the static location are compared. If the difference is outside of tolerances, an alert is raised. Similarly, if the wireless access device is defined to be mobile, its observed location is compared to its last observed location. Given the time delta between observations, a reasonable tolerance for the change in location can be calculated. If the delta in observed locations exceeds this tolerance, an alert is raised. This use of location for identifying MAC address spoofing eliminates the need for costly spectrum analysis equipment of other potential approaches and leverages the existing properties of the 802.11 wireless access devices.

In addition to detecting spoofing via changes in the location of a wireless access device, other techniques can be used in a wireless network to detect spoofing and other anomalies. One approach would be to observe and report on every 802.11 packet. This, however, would be difficult to implement because of cost and processing constraints. Instead, a distributed approach can be used to track data that can be used to detect various anomalies. In one embodiment of the present invention, a state table is constructed that tracks the current activity of all observed 802.11 wireless access devices and only reports changes in the state of the wireless access device. This enables the WIDS node to sample all 802.11 channels in a short period of time, store only the current state of the wireless access device, and report only on changes in that state.

While other IDS solutions observe traffic with the goal of identifying intrusions, the source of the intrusion, and the target of the intrusion, a state based approach to wireless intrusion detection focuses on the presence of an intrusion, the location of the source, and the identification of the target. Based on the state changes of the intruding wireless access device and the target wireless access device, the intrusion technique can be determined.

Observing an 802.11 network is equivalent to monitoring a wired network in the sense that all packets seen are at the data-link layer (layer 2) of the well known Open System Interconnect (OSI) model. In 802.11 MAC frames, however, the class and type of packet are included. There are three classes of 802.11 MAC frames: management, data, and control. For each of these MAC frames, the direction and type of data can be determined by parsing various fields within the MAC frames. This can permit an observer to determine the existence of an intruder and the activity of that intruder without reconstructing higher layer sessions by parsing and storing the data portion of the MAC frame.

In general, 802.11 wireless access devices move through the various states of a session in a predictable manner, as described below with respect to FIG. 6 and FIG. 7. This facilitates the tracking of the current state and possible next states for a particular wireless access device. This information can be obtained quickly from observing 802.11 MAC frames, and the storage of this information is minimal. Reporting only changes in wireless access device state greatly reduces the amount of traffic between a WIDS node and a WIDS collector when compared with reporting performed with the observation of each packet.

In an embodiment, tracking the states of one or more wireless access devices can consist of the following process. First, a state transition table is created that includes a wireless access device, its state, and the devices with which it is communicating.

When a wireless access device that does not have an entry in the state transition table is observed as either the transmitter or receiver of an 802.11 packet, an entry in the state transition table is created and an event is sent to the WIDS collector. When a wireless access device that has an entry in the state transition table is observed at a later time, the type of the observed packet as well as the participating device is compared to the contents of the state transition table entry. If either piece of data is different from that of the state transition table entry, the state transition table entry is updated and an event notification is sent to the WIDS collector. The events received by the WIDS collector can then be used to check for security policy violations, new intruders, and anomalous wireless access device behaviors. In particular, the WIDS collector can be configured with one or more policy elements that define the types of activities that are permitted or prohibited for a particular network. In the event that a policy element is violated, a user can be signaled by sending an alert to that user. The user could then evaluate the alert and respond accordingly. For example, a policy element could consist of an indicator that the wireless access device is a fixed wireless access device, a movable wireless access device, a moving wireless access device, an unknown wireless access device, or a spoofed wireless access device. Although these are just a few examples, there are many other policy elements that could be defined for a given network.

Figure 6:
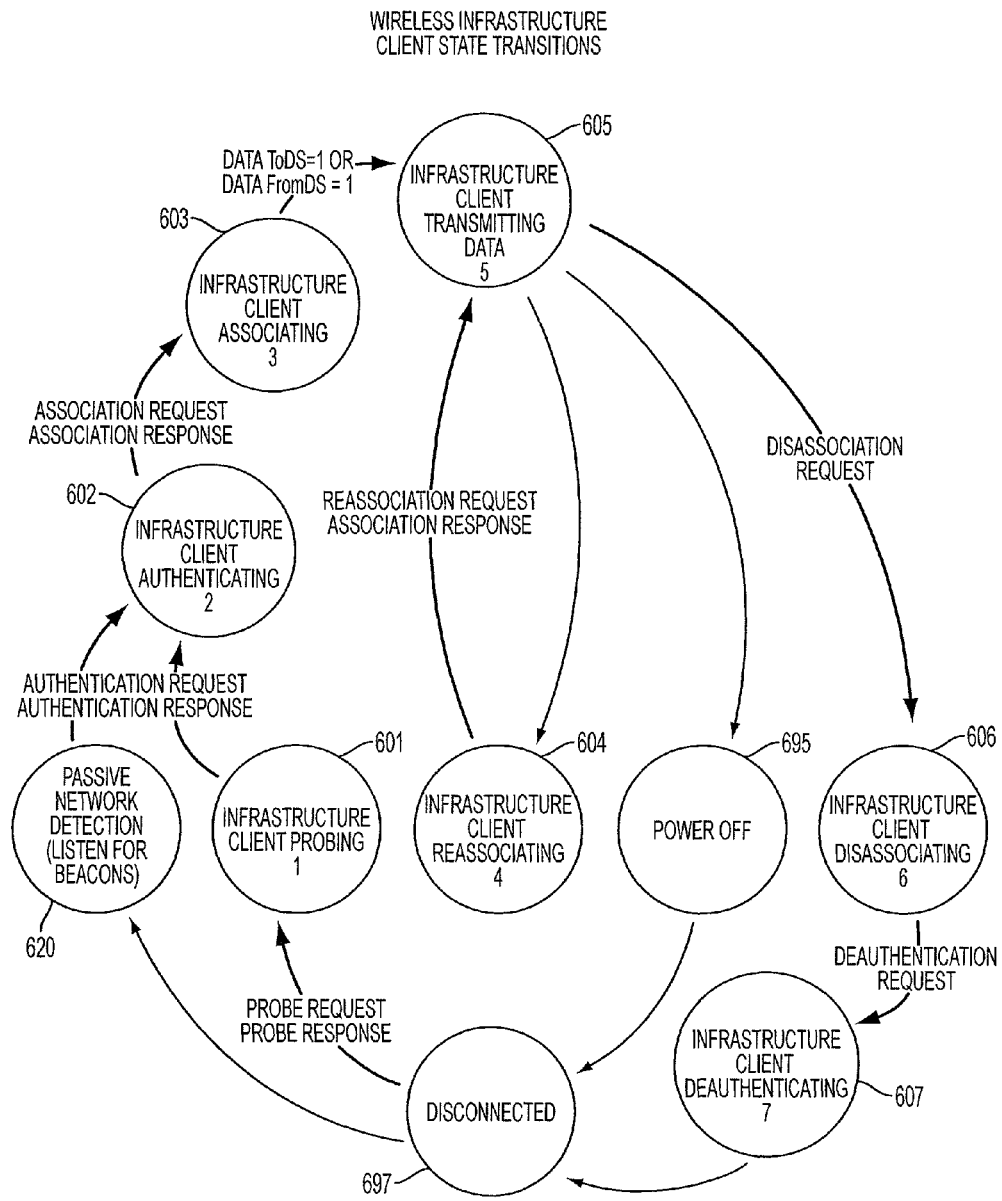
FIG. 6 is a state transition diagram of a client in an infrastructure wireless network.

FIG. 6 is a state transition chart illustrating the valid state changes through which a wireless access device may progress. Specifically, a wireless access device in infrastructure mode (i.e., an infrastructure client) would, in one embodiment, start out in disconnected state 697. Upon sending a probe request and waiting for a probe response, infrastructure client would progress to state 1, infrastructure client probing 601. After receiving the response, the infrastructure client would issue an authentication request and then transition to state 2, infrastructure client authenticating 602.

While in state 2, infrastructure client authenticating 602, the infrastructure client would receive an authentication response from the access point, then issue an association request. The infrastructure client would then transition to state 3, infrastructure client associating 603. The client would remain in state 3, infrastructure client associating 603, until it receives an association response from the access point. At that point, it would be free to send or receive a data frame from the access point. Upon receipt of such a frame, the infrastructure client would transition to state 5, infrastructure client transmitting data 605. The infrastructure client would remain in state 5, infrastructure client transmitting data 605, until it either (a) issues a disassociation request, (b) powers down, or (c) becomes disassociated due to some other reason. In the latter case, where the infrastructure client has become disassociated and has entered state 4, infrastructure client reassociating 604, the infrastructure client would transition back to state 5, infrastructure client transmitting data 605, upon issuing a reassociation request and receiving an association response.

In the case where the infrastructure client issues a disassociation request, it would enter state 6, infrastructure client disassociating 606. Once in this state, the infrastructure client would then issue a deauthentication request and enter state 7, infrastructure client deauthenticating 607. Once deauthenticated, the infrastructure client would then enter disconnected state 697.

FIG. 6 illustrates one further state that could occur. In passive network detection (listen for beacons) state 620, the infrastructure client passively listens for beacons.

Figure 7:
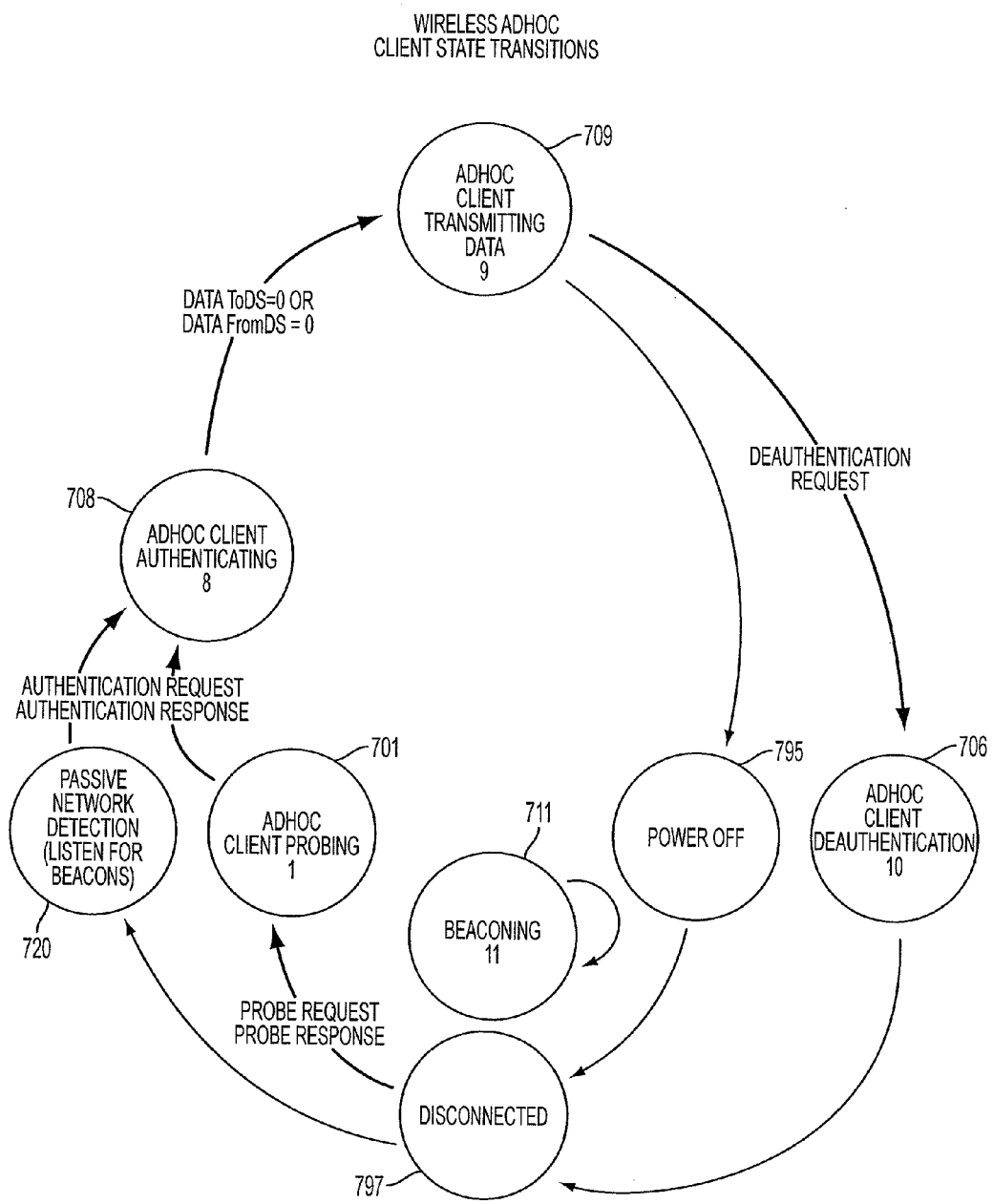
FIG. 7 is a state transition diagram of a client in an ad hoc wireless network.

FIG. 7 a state transition chart illustrating additional valid state changes through which a wireless access device may progress. Specifically, a wireless access device in ad hoc mode (i.e., an ad hoc client) would, in one embodiment, start out in disconnected state 797. Upon sending a probe request and getting a probe response, ad hoc client would progress to state 1, ad hoc client probing 701. The ad hoc client would then issue an authentication request and, upon receiving an authentication response from another client in the ad hoc network, would transition to state 8, ad hoc client authenticating 708. The ad hoc client would remain in state 8, ad hoc client authenticating 708, until one of the other ad hoc clients initiated a data transfer to or from the ad hoc client of interest by sending a predetermined 802.11 frame to the ad hoc client of interest. Upon receipt of such a frame, the ad hoc client would transition to state 9, ad hoc client transmitting data 709. The ad hoc client would remain in state 9, ad hoc client transmitting data 709, until it either (a) issues a deauthentication request, or (b) powers down.

FIG. 7 illustrates two additional states could occur. In passive network detection (listen for beacons) state 720, the ad hoc client passively listens for beacons. In beaconing state 711, the ad hoc client beacons other ad hoc clients.

FIG. 8 contains an exemplary state transition table 800 that could be maintained at a WIDS node in an embodiment of the present invention. Such a table could be used for a number of different tasks, including identification of illegal state changes for a given wireless access device. As an example, at a step 802, WIDS node X could detect Client A initializing with an access point AP001. In this example, step 802 starts out with event 1 corresponding to Client A issuing a probe request, and receiving a probe response back from AP001 in event 2. This will result in Client A being in state 1 (corresponding to infrastructure client probing 601 in FIG. 6). Step 802 continues with Client A issuing an authentication request in event 3, and receiving an authentication response from access point AP001 in event 4, resulting in Client A being in State 2. Continuing with the initialization in state 3, Client A issues an association request in event 5 and receives an association response in event 6. Finally, at the end of step 802, Client A and access point AP001 begin passing data, with Client A being in State 5.

Continuing with the example, at a step 804, WIDS node X could detect Client B initializing with an access point AP002. Step 804 starts out with event 9 corresponding to Client B issuing a probe request, and receiving a probe response back from AP002 in event 10. This will result in Client B being in state 1. Step 804 continues with Client B issuing an authentication request in event 11, and receiving an authentication response from access point AP002 in event 12, resulting in Client B being in State 2. Continuing with the initialization in state 3, Client B issues an association request in event 13 and receives an association response in event 14. At the end of step 804, Client B and access point AP002 begin passing data, with Client B being in State 5.

In a step 806, Client A appears to goes through the same initialization process described above with respect to step 802, but now with access point AP003 instead of access point AP001. Next, in a step 808, an event has occurred where Client A is now communicating again with Access Point AP001. This could be a possible spoof, where one wireless access device is being made to appear as a different wireless access device through, for example, the use of illegitimate credentials. This could occur, for example, where a wireless access device asserts a device identification (e.g., a MAC address) of a different wireless access device known to exist within the wireless network. The state table analysis, which can occur at either the WIDS collector or WIDS node, can detect the potential spoof since Client A appears to have transitioned from State 5 while communicating with access point AP003 to State 5 while now communicating again with access point AP001 (without initializing with access point AP001 again). This indicates that the initialization by the supposed Client A with access point AP003 at step 806 was a likely spoof, since the likely real Client A was still attempting communication with access point AP001 in step 808. Once this illegal set of transitions has been identified, an alert could be raised so that an investigation could be conducted.

In a step 810, Client B issues a probe request at event 27 and receives a probe response from access point AP099. At a step 812, however, Client B immediately begins transmitting data to access point AP099. This is an illegal state transition for which an alert could also be raised.

Figure 9:
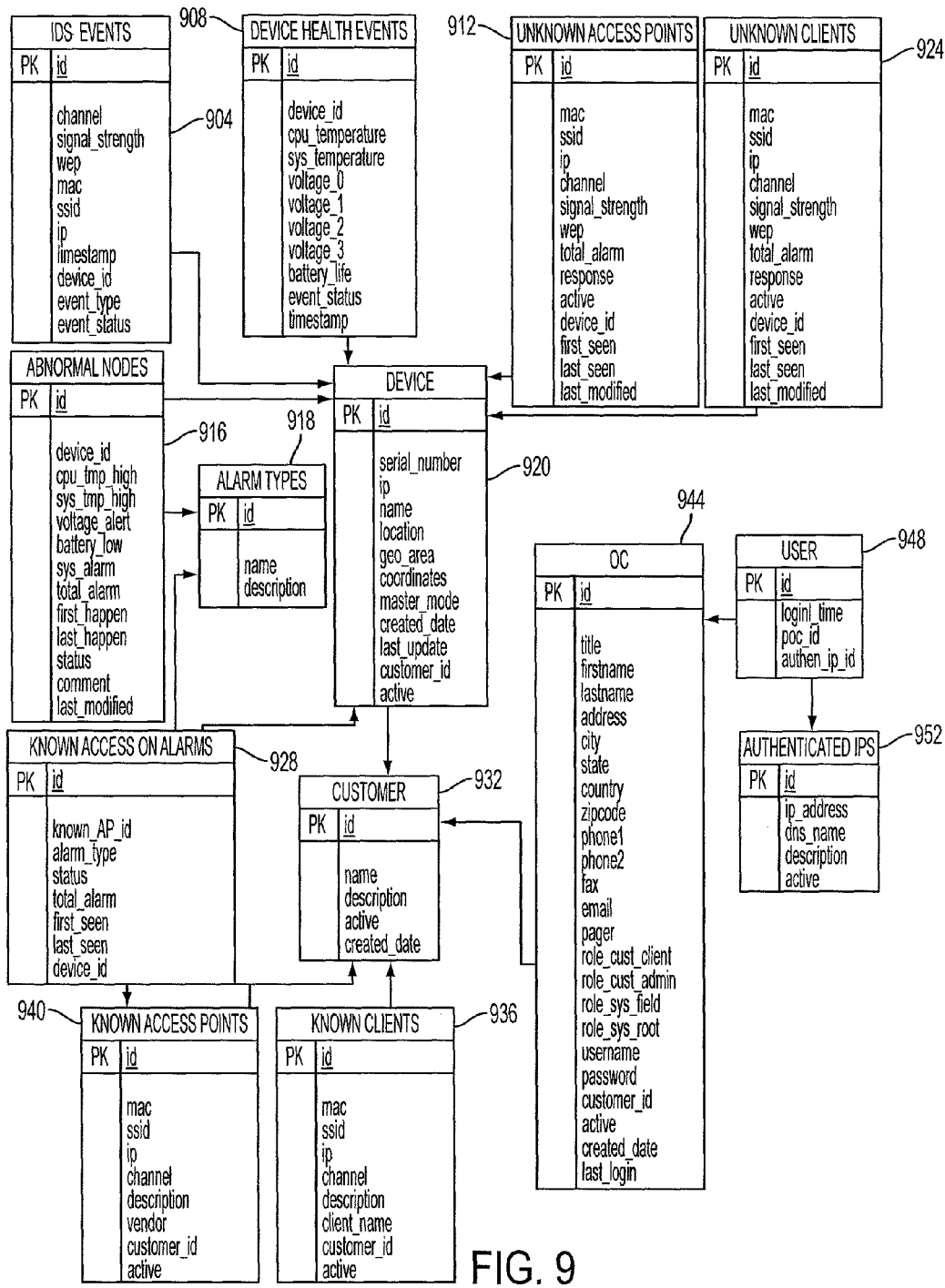
FIG. 9 depicts the schema of a back end database in a WID system.

FIG. 9 depicts the schema of a back end database in a WID system. Each schema utilizes an identification (or id) field as its primary key. Furthermore, each schema contains a number of fields that describe various aspects of the WID system. Such schema could be used to store information on the location of a wireless access device or on characteristics of a wireless access device, as determined above. Each schema is described with respect to the following tables.

TABLE 6

IDS_Events

| Element | Description |
| --- | --- |
| Id | an auto increment number used as primary key for the event |
| channel | primary data from WIDS node |
| signal_strength | primary data from WIDS node |
| Wep | primary data from WIDS node |
| mac | primary data from WIDS node |
| ssid | primary data from WIDS node |
| timestamp | primary data from WIDS node |
| device_id | from trap service |
| event_type | set by trap service (e.g., 0 for access point, 1 for client) |
| Event_status | Will be set to 0 (null) when created by trap service. As events process sweep is initiated, it will be set to 1 (processing). After processing is finished, it will be set to 2 (reported). |

Table 6 defines the data fields contained in the IDS_Events schema 904 shown in FIG. 9, including the channel and signal strength of the particular WIDS node, along with information on WEP, the MAC address, and the SSID of the WIDS node. IDS_Events also includes a timestamp of the event, a device_id value from the trap service, the type of event that has occurred, and the event status.

TABLE 7

Device_Health_Events

| Element | Description |
| --- | --- |
| id | an auto increment number as primary key |
| device_id | from trap service |
| cpu_temperature | primary data from WID |
| sys_temperature | primary data from WID |
| voltage_0 | primary data from WID |
| voltage_1 | primary data from WID |
| voltage_2 | primary data from WID |

TABLE 7-continued

Device_Health_Events

| Element | Description |
| --- | --- |
| voltage_3 | primary data from WID |
| battery_life | primary data from WID |
| timestampt | primary data from WID |

Table 7 defines the data fields contained in the Device_Health_Events schema 908 shown in FIG. 9, including a device_id value from the trap service, values related to the health status of the WIDS node, and a timestamp value. The health status values can include, for example, the CPU temperature, the system temperature, various voltage values, and the battery life.

TABLE 8

Unknown_AccessPoints

| Element | Description |
| --- | --- |
| id | an auto increment number as primary key |
| mac | the mac of unknown Access Point |
| ssid | the ssid of unknown Access Point |
| ip | the ip address of unknown Access Point |
| channel | the channel this unknown Access Point went through |
| signal_strength | the signal strength of the unknown Access Point that the WID detected |
| wep | the encryption bits this unknown Access Point used |
| total_alarm | count the total occurrences of a unknown Access Point which has the same mac, ssid, ip, channel, wep, device_id |
| response | will be filled by users when a proper action has been done |
| active | When a new Access Point is discovered and entered, active == True. The user can change the active == false if the access point is no longer visible. Once the new ids events report this unknown Access Point again, it will be active == true again. |
| device_id | comes from backend process |
| first_seen | The first time when this unknown Access Point was detected by WID |
| last_seen | The last time when this unknown Access Point was detected by WID |
| last_modified | The last time when this unknown Access Point record was modified in the table to track the date of any modification of this unknown AP |

Table 8 defines the data fields contained in the Unknown_AccessPoints schema 912 shown in FIG. 9, which are filled by a backend sweep process at the WIDS collector. This process checks the new IDS events and adds new unknown access points to the database according to the above schema. Information about the unknown access points that is entered into the database can include the MAC address, SSID, IP address, channel, signal strength, and WEP status. In addition, information about the status of the actions related to the unknown access points can be entered into the database, including the total number of times the same access point has been detected, the response taken, and whether the unknown access point is active. In addition, the database entry for unknown access points can contain the device ID of the WIDS node, the time it was first and last seen by a WIDS node, and the last time the particular unknown access point entry in the database was modified.

TABLE 9

Unknown_Clients

| Element | Description |
| --- | --- |
| id | an auto increment number as primary key |
| mac | the mac of unknown Client |
| ssid | the ssid of unknown Client |
| ip | the ip address of unknown Client |
| channel | the channel this unknown Client went through |
| signal_strength | the signal strength of the unknown Client that the WID detected |
| wep | the encryption bits this unknown Client used |
| total_alarm | count the total occurrences of a unknown Client which has the same mac, ssid, ip, channel, wep, device_id |
| response | will be filled by users when a proper action has been done |
| active | When a new Client is discovered and entered, active == True. The user can change the active == false if the Client is no longer visible. Once the new ids events report this unknown Client again, it will be active == true again. |
| device_id | comes from backend process |
| first_seen | The first time when this unknown Client was detected by WID |
| last_seen | The last time when this unknown Client was detected by WID |
| last_modified | The last time when this unknown Client record was modified in the table to track the date of any modification of this unknown AP |

Table 9 defines the data fields contained in the Unknown_Clients schema 924 shown in FIG. 9, which are filled by a backend sweep process at the WIDS collector. This process checks the new IDS events and adds new unknown clients to the database according to the above schema. Information about the unknown clients that is entered into the database can include the MAC address, SSID, IP address, channel, signal strength, and WEP status. In addition, information about the status of the actions related to the unknown clients can be entered into the database, including the total number of times the same client has been detected, the response taken, and whether the unknown client is active. In addition, the database entry for unknown clients can contain the device ID of the WIDS node, the time it was first and last seen by a WIDS node, and the last time the particular unknown client entry in the database was modified.

TABLE 10

Devices

| Element | Description |
| --- | --- |
| id | an auto increment number as primary key |
| serial_number | the WIDS node's serial number |
| ip | the ip address of the WIDS node |
| name | the descriptive name of the WIDS node |
| location | describes the geographic position of the WIDS node |
| geo_area | some description of the area of this WIDS node (Note that the range of area will be wider than the location. Some WIDS nodes may stay in the same area with different location.) |
| coordinates | the data of this WIDS node's coordinates format like (x, y) from GPS. |
| master_mode | if this WIDS node is a primary WIDS node, this field will be 1, otherwise it will be 0 |
| create_date | the first time when the device registered, it will be stored into this table as the create date |
| last_update | the last time when the record of the device been modified, it will be recorded as the date of last update |
| customer_id | this field tells which customer this WIDS node belongs to |
| active | used for device management to maintain the current devices as ACTIVE, the historical devices as NOT ACTIVE |

Table 10 defines the data fields contained in the Devices schema 920 shown in FIG. 9, which contains data elements related to each WIDS node. This can include, for example, the IP address of the WIDS node, along with the name, location, geographic area, and coordinates of the WIDS node. The Devices schema can also include an indication of whether the entry is a primary WIDS node, the creation date (i.e., the date the WIDS node was put into service), the date of the last update of the WIDS node, an identification of the customer, and a flag to indicate whether the WIDS node is currently active.

TABLE 11

Abnormal_Nodes

| Element | Description |
| --- | --- |
| id | an auto increment number as primary key |
| device_id | the foreign key that points to the Devices table which this abnormal device belongs |
| cpu_tmp_high | the alarm flag to show the WIDS node's CPU temperature going too high (Boolean variable) |
| sys_tmp_high | the alarm flag to show the WIDS node's system temperature going too high (Boolean variable) |
| voltage_alert | the alarm flag to show the WIDS nodes' voltage going to alert level (Boolean variable) |
| battery_low | the alarm flag to show the battery's life going to be end level |
| sys_alarm | this is a foreign key to point to Alarm_Types table, right now there are two types (they are: device down, device's configuration changed). Note, this filled will be filled by other process when the alarm WID is still active, this field will be updated once any one of the alarms is raised, otherwise it will insert a new alarm record for this device |
| total_alarm | before the status of this record is "CLOSED," the total_alarm will accumulate the occurrences of the alarm once no matter what kind of alarm or alert it has |
| first_happen | the first time this record is created |
| last_seen | the last time the event process updates this record |
| status | this is a flag to see if this abnormal device report record has been responded to or not, if yes the record will be marked as "CLOSED" |
| comment | the user may add some comment for this record before the record is closed |
| last_modified | marks the last time when the record was updated |

Table 11 defines the data fields contained in the Abnormal_Nodes schema 916 shown in FIG. 9, which contains data elements related to any WIDS nodes that have indicated any problems. This schema can include, for example, WIDS nodes that have temperatures that are too high or voltages that are too high or too low. The data fields in this schema can include the device ID, flags indicating the problem being experienced by the WIDS node, various alarm indicators, the time of the first event being recorded, the time of the last time the event was recorded, the status of any responses to previous alarm indicators, a comment, and an indication of the last time that the abnormal WIDS node entry in the database was modified.

TABLE 12

Alarm_Types

| Element | Description |
|---|---|
| id | an auto increment number as primary key |
| name | the name of the alarm type, so far have "Device_down", "Config_Changed" |
| description | the description of the alarm type; |

Table 12 defines the data fields contained in the Alarm_Types schema 918 shown in FIG. 9, which contains data elements related alarms. This can include, for example, the name of the alarm type and its description.

TABLE 13

Known_AccessPoint_Alarms

| Element | Description |
|---|---|
| id | an auto increment number as primary key |
| alarm_type | the FK of the table which points to the Alarm_Types table to see what type of alarm this record is |
| status | this is a flag to see if this record has been CLOSED or still OPEN |
| total_alarm | accumulates the occurrences of the same Known AP's alarm |
| first_seen | marks the first time when this alarm was detected |
| last_seen | marks the last time when this alarm is detected |
| device_id | which device detected this alarm |

Table 13 defines the data fields contained in the Known_AccessPoints_Alarms schema 928 shown in FIG. 9, which contains data elements related to alarms for known access points. This can include, for example, the type of the alarm, the status of the particular record associated with the alarm, the total number of alarms for the same known access point, the time of the first alarm being recorded, the time of the last time the alarm was recorded, and the WIDS node that detected the alarm.

TABLE 14

Known_AccessPoints

| Element | Description |
|---|---|
| id | an auto increment number as primary key |
| mac | the mac of the Access Point |
| ssid | the ssid of the Access Point |
| ip | the ip address of the Access Point |
| channel | the channel this Access Point uses |
| description | Any useful information about the Access Point |
| vendor | the vendor of this known Access Point |
| customer_id | which customer owns this Access Point |
| active | if the known Access Point is no longer exist it will not be NOT ACTIVE, otherwise it will be ACTIVE |

Table 14 defines the data fields contained in the Known_AccessPoints schema 940 shown in FIG. 9. Information about the known access points that is entered into the database can include the MAC address, the SSID, the IP address, the channel used by the known access point, a text description, a field identifying the customer that owns the known access point, and a flag indicating whether the known access point is active.

TABLE 15

Known_Clients

| Element | Description |
|---|---|
| id | an auto increment number as primary key |
| mac | the mac of the Client |
| ssid | the ssid of the Client |
| ip | the ip address of the Client |
| channel | the channel this Client uses |
| description | any useful information about the Client |
| client_name | the descriptive name for this Client |
| customer_id | which customer owns this Client |
| active | if the known Client is no longer exist it will not be NOT ACTIVE, otherwise it will be ACTIVE |

Table 15 defines the data fields contained in Known Clients schema 936 shown in FIG. 9. Information about the known clients that is entered into the database can include the MAC address, the SSID, the IP address, the channel used by the known client, a text description, a field identifying the client name, a field identifying the customer that owns the known client, and a flag indicating whether the known client is active.

TABLE 16

Customers

| Element | Description |
|---|---|
| id | an auto increment number as primary key |
| name | the name of the customer |
| description | any useful information about the customer |
| active | if the known Customer is no longer exists it will not be NOT ACTIVE, otherwise it will be ACTIVE |
| created_date | marks the first time when this customer record is created |

Table 16 defines the data fields contained in Customers schema 932 shown in FIG. 9, which can information such as the name of the customer, a text description, a flag indicating whether the customer exists, and the date the customer record was created.

TABLE 17

POG

| Element | Description |
|---|---|
| id | an auto increment number as primary key |
| title | the title of user |
| firstname | the first name of the user |
| lastname | the last name of the user |
| address | the address of the user |
| city | registration information |
| state | registration information |
| country | registration information |
| zipcode | registration information |
| phone1 | registration information |
| phone2 | registration information |
| fax | registration information |
| email | registration information |
| pager | registration information |
| role_cust_client | if the user is a Customer Client this field will be set as 1 |
| role_cust_admin | if the user is a Customers Admin this field will be set as 1 |
| role_sys_field | if the user is a System Field Engineer this field will be set as 1 |
| role_sys_admin | if the user is a System Root Engineer this field will be set as 1 |
| active | if the known Customer is no longer exist it will not be NOT ACTIVE, otherwise it will be ACTIVE |
| created_date | marks the first time when this user record is created |

Table 17 defines the data fields contained in Point of Contact (POC) schema 944 shown in FIG. 9. POC information about the user can include the title, first name, last name, address, phone numbers, a set of flags indicating the role of the user, a flag indicating whether the user exists, and the date the user record was created.

TABLE 18

Authenticated_tips

| Element | Description |
| --- | --- |
| id | an auto increment number as primary key |
| ip_address | the IP address which is legal for accessing the collector application |
| host_name | the host name |
| description | any useful information about the entry |
| active | describes if the authenticated IP is still active or not |

Table 18 defines the data fields contained in Authenticated_ips schema 952 shown in FIG. 9, which is used to store the authenticated Ethernet hosts that can access the web server associated with the wireless network of interest. The entries in the database associated with this schema can include the IP address of the host, the host name, a text description, and a flag indicating whether the host is active.

TABLE 19

Userlog

| Element | Description |
| --- | --- |
| id | an auto increment number as primary key |
| login_time | records each user's login time whenever they logged into the system |
| poc_id | records the user id |
| authen_ip_id | records which remote authenticated host the user came from |

Table 19 defines the data fields contained in Userlog schema 948 shown in FIG. 9, which is used to track the user login data. The entries in the database associated with this schema can include the user's login time, the user's identification, and the host from which the user logged in.

Figure 10:
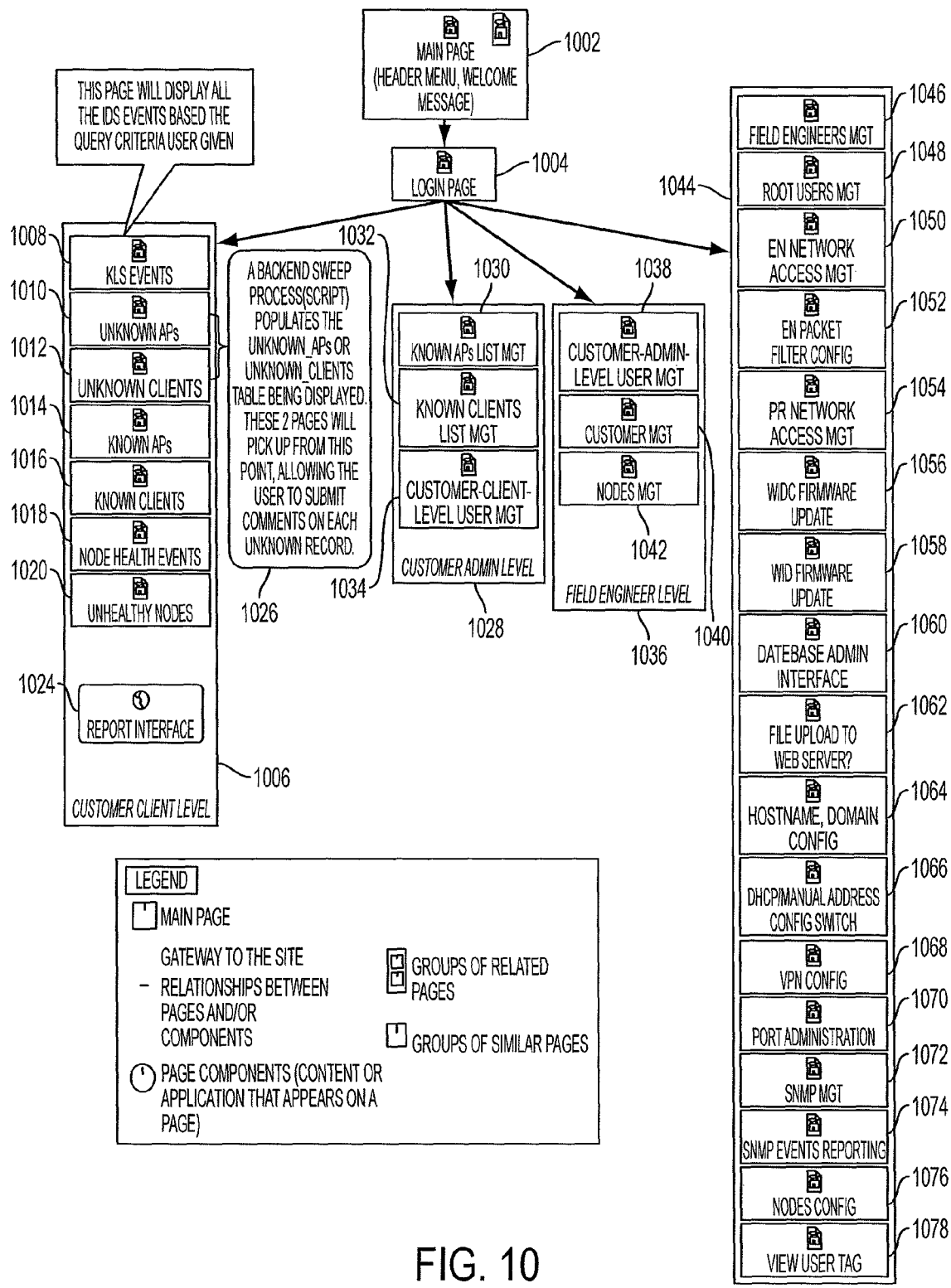
FIG. 10 is a depiction of a web page structure for an implementation of a user interface to a WID system.

FIG. 10 is a depiction of an exemplary structure for an implementation of a user interface to a WID system using the worldwide web. Such a web server interface would allow access to alarm monitoring and system management information contained in the WIDS collector. The interface fully controls system access level to the WIDS collector, and presents to both customers and administrative personnel a well established wireless event monitoring and management center.

The main page, shown as web page 1002, consists of a header menu and a welcome message, along with possibly other introductory information. Web page 1004 is a login page, where various users could access information about the WID system. In an embodiment, a user would login to access the WID system over the Internet. Alternatively, the user could login to access the WID system over a private network, such as a corporate intranet. A user can have one or more authorization levels. In an embodiment, the authorization levels can include a customer client, customer administrator, field engineer, or root administrator. A customer client or customer administrator can be associated with different groups or business units within the customer organization.

After logging in, a user could check on numerous types of information, with the specific information available to each user being dependent on the user's login authorization level.

The system functionalities can be divided into four main areas:

(1) Customer Client Level interface 1006 provides access to the following functions and accessibility:

View IDS events 1008: This page will display all the IDS events. It may contain a criteria form, which, in one embodiment, can include the following database elements: event_type, devices, dayindex, specific mac or ssid, and a list of choice of sorting methods. Additional criteria can be added as necessary.

View unknown access points 1010: This page displays unknown access points and their occurrences, and allows users to fill in the response upon observation and analysis, which allows a user to insert a user comment about that access point. In one embodiment, a popup window could be used to provide this functionality. This page is populated by a sweep of the Unknown_Access-Points table in the database.

View unknown clients 1012: This page displays clients who have attempted access to the wireless network and their occurrences, and allows users to fill in the opinion upon observation and analysis. In one embodiment, a popup window could be used to provide this functionality. This page is populated by a sweep of the Unknown_Clients table in the database.

View known access points 1014: This page displays known access points that belong to the customer and their occurrences.

View known clients 1016: This page displays known clients that belong to the customer and their occurrences.

View WIDS node health status 1018: This regularly updated page displays the current status of all WIDS nodes and indicates any abnormalities detected at any of the WIDS nodes. An abnormal WIDS node report button will allow the user to create a printed report of abnormal WIDS nodes. In an embodiment, this page is updated every five minutes, although the update rate can be adjusted to meet the specific needs of the customer.

View unhealthy WIDS nodes 1020: This page displays unhealthy WIDS nodes that have already been reported to users by the WID system, and provides an update button and several status indicators to allow users to update the status of any unhealthy WIDS nodes.

Report interface 1024: This page allows a customer to create various reports, including, for example, hourly, daily, weekly, or monthly reports. It also allow a customer to generate summaries and graphics indicative of the various data reported by the WID system.

(2) Customer Administrator Level interface 1028 (which includes all of the Customer Client Level privileges described above) provides access to the following additional functions and accessibility:

Known Access Points List Management 1030: This interface allows a customer to add new known access points, or activate/deactivate the currently identified access point in the list of known access points.

Known Clients List Management 1032: This interface allows a customer to add new known clients, or activate/deactivate the currently identified client in the known clients list.

Customer Client Level User Management 1034: This interface allows a customer to control its customer client accounts, including, for example, adding new users, or activating/deactivating a user identified in the point of contact (POC) list associated with the role of customer client.

(3) Field Engineer Level interface 1036 (which includes all of the Customer Client Level and Customer Administrator Level privileges described above) provides access to the following additional functions and accessibility:

Customer Administration Level User Management 1038: This interface allows a field engineer to control customer administrator accounts, including, for example, adding new users, or activating/deactivating a user identified in the point of contact (POC) list associated with the role of customer administrator.

Customer Management 1040: This interface allows a field engineer to add new customers or activate/deactivate the currently selected one in a customer list.

Device Management 1042: This interface allows a field engineer to add new devices or activate/deactivate the currently selected one in a device list.

(4) Root Administrator Level interface 1044 (which includes all privileges described above for the Customer Client Level, Customer Administrator Level, and Field Engineer Level) provides access to the following root level functions and accessibility:

Field Engineers Management 1046: This interface allows a root administrator to add new field engineers or activate/deactivate the current one in the POC list associated with the role of Network field admin.

Root User Management 1048: This interface allows a root administrator to add new root users or activate/deactivate the currently selected one in a POC list associated with the role of root administrator.

Ethernet (EN) Network Access Management 1050: This interface allows input from management console to apply configuration changes to packet filter or firewall configuration. Effect is to limit availability of access to the administrative web server to only authorized hosts or network segments.

EN Packet filter configuration 1052: Collector Ethernet network access controls and restrictions. Input from management console applies configuration changes to packet filter or firewall configuration. Effect is to limit availability of access to the administrative web server to only authorized hosts or network segments.

Packet radio (PR) network access management 1054: 900 Mhz radios implement frequency-hopping and pseudo-random numbers as seed to provide link-level authentication unique to a given deployed network.

WIDS collector firmware update 1056: This interface allows input from the management console to upload firmware upgrades to the WIDS collector.

WIDS nodes firmware update 1058: This interface allows input from the management console to upload firmware upgrades to the nodes.

Database administrator interface 1060: This interface allows input from the management console to perform database administration.

Upload new files to web server 1062: This interface allows input from the management console to install files onto the WIDS collector web server.

Hostname, Domain configuration 1064: This interface allows input from the management console to change the identification information of the WIDS collector.

Network configuration interface (Dynamic Host Configuration Protocol (DHCP) or manual address configuration) 1066: This interface allows input from the management console to configure WIDS collector network settings.

VPN Configuration 1068: This interface allows input from the management console to configure Virtual Private Network settings on the WIDS collector, if used.

Port administration 1070: This interface allows input from the management console to modify TCP port assignments on the WIDS collector to, for instance, assign the web server access on port 4000 instead of 80 (default).

SNMP management 1072: Provides the following services—1) specifies community string; 2) A checking list for appropriate packet filter rules; 3) Cryptographic hash, also display to hint user to enter this into their EMS.

SNMP event reporting 1074: Specifies IP address of SNMP trap loghost (default set as localhost).

Node Configuration 1076: 1) Manual selection of master node; 2) Debug mode toggle.

View userlog data 1078: This interface allows viewing from the management console of the log of WIDS collector access attempts by users.

According to the different access levels listed above, a POC table that maintains the roles of users is created in the database depicted in FIG. 9. The POC table allows the WID system to manage the level of access of each user. Via entry of a username and associated password authentication, the corresponding privileges will be granted to each specific user. Attempts to access different levels within the web page that are outside of the specific privileges associated with a user can cause a login window to appear, which will prompt the users to enter additional authentication information to gain the access to a specific level.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A network device comprising:
a processing device in communication with a memory, the processing device configured to execute instructions received from the memory to:
create a state transition table for one or more detected wireless access devices in a wireless network, the state transition table including:
a first entry that includes information identifying a first state of a communication session, via the wireless network, between the one or more detected wireless access devices and at least one device,
the first state being associated with one or more respective identifiers of the one or more detected wireless access devices and a type of at least one packet identifying the one or more detected wireless access devices,
observe a plurality of packets transmitted by the one or more detected wireless access devices,
identify, based on observing the plurality of packets, a state change from the first state for at least one of the one or more detected wireless access devices in response to determining that types of the plurality of packets differ from the type of the at least one packet or in response to determining that the plurality of packets are associated with a source or a destination other than the at least one device, and report the identified state change to another network device.

2. The network device of claim 1, wherein the processing device is further configured to:
determine whether the state change corresponds to a next state transition that is prescribed by a wireless network standard, the identified state change being reported to the other network device in response to determining that the next state transition is not prescribed by the wireless network standard.

3. The network device of claim 2, wherein the processing device is further configured to:
determine, in response to determining that the next state transition is not prescribed by the wireless network standard, that a type of activity associated with the next state transition violates a network policy associated with the network device.

4. The network device of claim 3, wherein the type of activity comprises at least one of:
a security violation,
a communication with an intruder to the wireless network, or
an anomalous behavior by the at least one of the one or more detected wireless access devices.

5. The network device of claim 1, wherein the processing device is further configured to:
identify protocol information included in individual ones of the plurality of packets, and
determine, based on the protocol information, whether one or more of the plurality of packets were transmitted over the wireless network or an ad hoc network that differs from the wireless network.

6. The network device of claim 5, further comprising:
an omni-directional antenna to observe the plurality of packets.

7. A method comprising:
creating a state transition table for one or more detected wireless access devices in a wireless network, the state transition table including:
a first entry that includes information identifying a first state of a communication session, via the wireless network, between the one or more detected wireless access devices and at least one device,
the first state being associated with one or more respective identifiers of the one or more detected wireless access devices and a type of at least one packet identifying the one or more detected wireless access devices,
observing a plurality of packets transmitted by the one or more detected wireless access devices,
identifying, based on observing the plurality of packets, a state change from the first state for at least one of the one or more detected wireless access devices in response to determining that types of the plurality of packets differ from the type of the at least one packet or in response to determining that the plurality of packets are associated with a source or a destination other than the at least one device, and
reporting the identified state change to another network device.

8. The computer-readable medium of claim 7, the operations further comprising determining, based on the plurality of diagnostic packets, a status of individual ones of the plurality of network devices.

9. The non-transitory computer-readable medium of claim 7, wherein the operations further comprise determining, based on one of the plurality of diagnostic packets, a battery life of a battery included in one of the plurality of second network devices.

10. The non-transitory computer-readable medium of claim 7, wherein the operations further comprise determining, based on one of the plurality of diagnostic packets, a temperature of a processor of one of the plurality of network devices.

11. The method of claim 7, further comprising determining whether the state change corresponds to a next state transition that is prescribed by a wireless network standard, the identified state change being reported to the other network device in response to determining that the next state transition is not prescribed by the wireless network standard.

12. The computer-readable medium of claim 11, wherein checking for violations of the policy elements set for the wireless network comprises determining whether a security violation has occurred.

13. The computer-readable medium of claim 11, wherein determining whether the particular activity has occurred the operations further comprising checking for violations of the policy elements set for the wireless network in response to determining that the wireless network device is communicating via an ad hoc network that differs from the wireless network.

14. The method of claim 11, further comprising determining, in response to determining that the next state transition is not prescribed by the wireless network standard, that a type of activity associated with the next state transition violates a network policy associated with the network device.

15. The method of claim 14, wherein the type of activity comprises at least one of:
a security violation,
a communication with an intruder to the wireless network, or
an anomalous behavior by the at least one of the one or more detected wireless access devices.

16. The method of claim 7, further comprising:
identifying protocol information included in individual ones of the plurality of packets, and
determining, based on the protocol information, whether one or more of the plurality of packets were transmitted over the wireless network or an ad hoc network that differs from the wireless network.

* * * * *